(12) United States Patent
Smyth et al.

(10) Patent No.: US 10,962,844 B1
(45) Date of Patent: Mar. 30, 2021

(54) ACTIVELY TUNABLE OPTICAL ELEMENT WITH FULL OR PARTIAL TRANSPARENCY

(71) Applicant: Facebook Technologies, LLC, Menlo Park, CA (US)

(72) Inventors: Katherine Marie Smyth, Seattle, WA (US); Andrew John Ouderkirk, Redmond, WA (US); Spencer Allan Wells, Seattle, WA (US); Robin Sharma, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 185 days.

(21) Appl. No.: 16/364,217

(22) Filed: Mar. 26, 2019

(51) Int. Cl.
*G02F 1/13* (2006.01)
*G02F 1/1343* (2006.01)
*G02B 5/30* (2006.01)
*G02B 27/01* (2006.01)
*G02F 1/03* (2006.01)

(52) U.S. Cl.
CPC ....... *G02F 1/13439* (2013.01); *G02B 5/3058* (2013.01); *G02B 27/0172* (2013.01); *G02F 1/0316* (2013.01); *G02B 2027/0178* (2013.01)

(58) Field of Classification Search
CPC .. G02F 1/13439; G02F 1/0316; G02F 1/0018; G02B 27/0172; G02B 5/3058; G02B 2027/0178
See application file for complete search history.

(56) References Cited

PUBLICATIONS

Park, et.al., "Metallic Grid Electrode Fabricated via Flow Coating for High-Performance Flexible Piezoelectric Nanogenerators", J. Phys. Chem. C, 119, 7802-7808 (Year: 2015).*
Miriyev et al., "Soft material for soft actuators", Nature Communications, Department of Mechanical Engineering, vol. 8, No. 596, 2017, pp. 1-8.
Pilet et al., "Piezoelectricity enhancement of P(VDF/TrFE) by X-ray irradiation", Organic Electronics, vol. 37, 2016, pp. 257-262.
Liu et al., "Control of crystal morphology and its effect on electromechanical performances of electrostrictive P(VDF-TrFE-CTFE) terpolymer", European Polymer Journal, vol. 91, 2017, pp. 46-60.
Le et al., "All-organic electrostrictive polymer composites with low driving electrical voltages for micro-fluidic pump applications", Scientific Reports, 5:11814, 2015, pp. 1-13.
(Continued)

*Primary Examiner* — Wen Huang
(74) *Attorney, Agent, or Firm* — FisherBroyles, LLP

(57) ABSTRACT

An optical element includes a primary electrode, a secondary electrode overlapping at least a portion of the primary electrode, and an electroactive layer disposed between and abutting the primary electrode and the secondary electrode. The optical element is configured to have a first optical transmittance and a first optical reflectance when a first voltage is applied between the primary electrode and the secondary electrode, and at least one of a second optical transmittance different from the first optical transmittance or a second optical reflectance different from the first optical reflectance when a second voltage different from the first voltage is applied between the primary electrode and the secondary electrode.

19 Claims, 14 Drawing Sheets

(56) References Cited

PUBLICATIONS

Xia et al., "PVDF-based dielectric polymers and their applications in electronic materials", IET Nanodielectrics, vol. 1, No. 1, 2018, pp. 17-31.
Wang et al., "Tactile-Sensing Based on Flexible PVDF Nanofibers via Electrospinning: A Review", Sensors, vol. 18, 330, 2018, pp. 1-16.
Stevens et al., "A Review of Adjustable lenses for Head Mounted Displays", International Society for Optics and Photonics, Proceedings of SPIE, vol. 10335, Digital Optical Technologies, Sep. 12, 2017, 20 pages.
Li et al., "Studies on the transformation process of PVDF from $\alpha$ to $\beta$ phase by stretching", RSC Advances, vol. 4, 2014, pp. 3938-3943.
Mohammadi et al., "Effect of tensile strain rate and elongation on crystalline structure and piezoelectric properties of PVDF thin films", Polymer Testing, vol. 26, 2007, pp. 42-50.
Lazarus et al., "Geometry-Induced Rigidity in Nonspherical Pressurized Elastic Shells", Physical Review Letters, vol. 109, No. 14, 2012, 6 pages.
Bonora et al., Active diffraction gratings: Development and tests, Review of Scientific Instruments, vol. 83, No. 12, Dec. 19, 2012, pp. 1-9.
"Manufacture of dichroics, areas of application and specifications", Technology, specifications and application of dichroic filters, URL: https://www.prinzoptics.de/en/technology-specifications-and-application-dichroic-filters, as accessed on 2018, pp. 1-24.
Kleinhans, W. A., "Aberrations of curved zone plates and Fresnel lenses", Applied Optics, vol. 16, No. 6, Jun. 1977, pp. 1701-1704.
Haertling, G. H., "Improved Hot-Pressed Electrooptic Ceramics in the (Pb,La)(Zr,Ti)O3 System", Journal of the American Ceramic Society, vol. 54, No. 6, Jun. 1971, pp. 1-19.
Jiang et al., "Transparent Electro-Optic Ceramics and Devices", Optoelectronic Devices and Integration, International Society for Optics and Photonics, Proceedings of SPIE, vol. 5644, 2004, 16 pages.
Kong et al., "Transparent Ceramic Materials", Transparent Ceramics, Topics in Mining, Metallurgy and Materials Engineering, 2015, pp. 29-91.

* cited by examiner

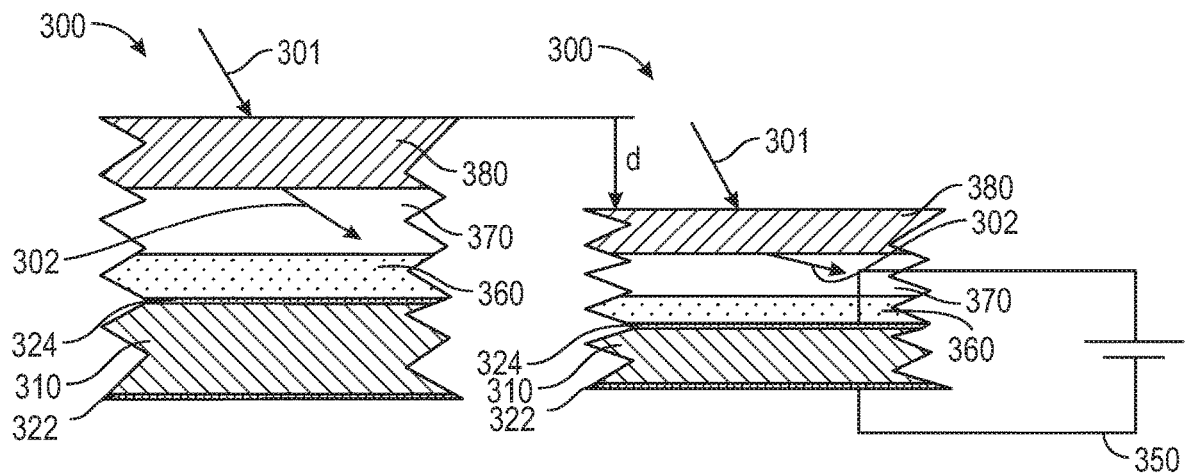
FIG. 3A FIG. 3B
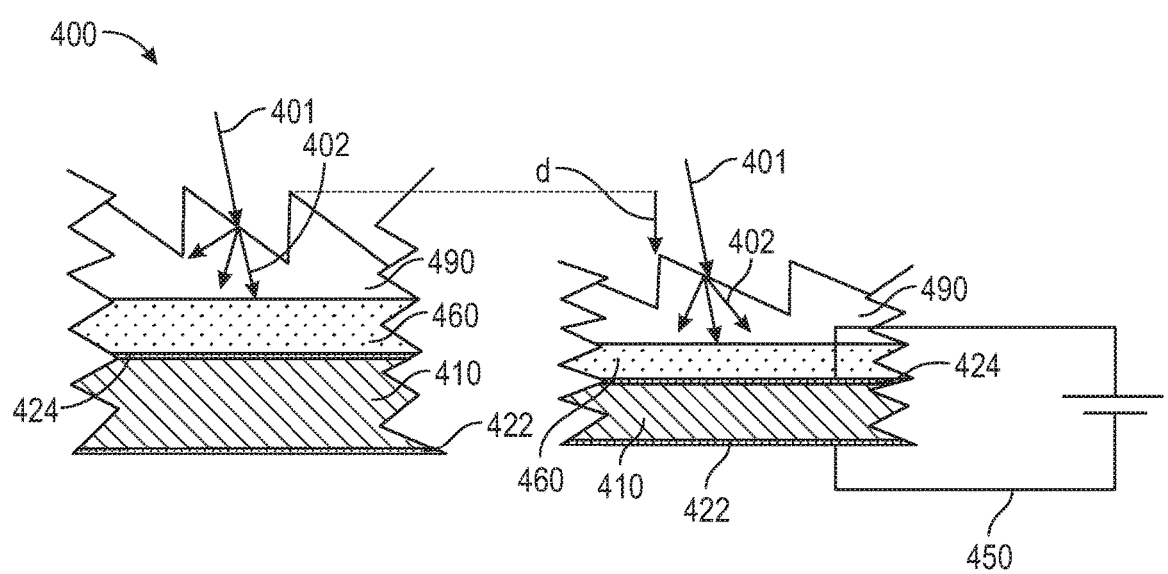
FIG. 4A FIG. 4B

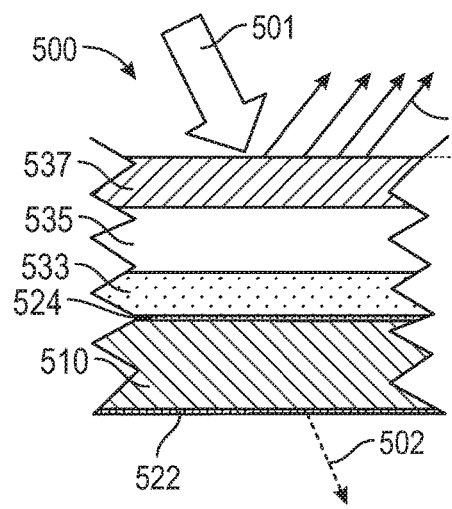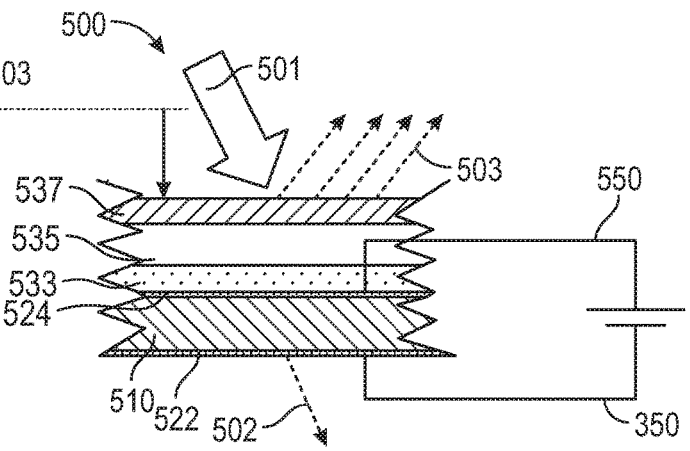
*FIG. 5A*  *FIG. 5B*
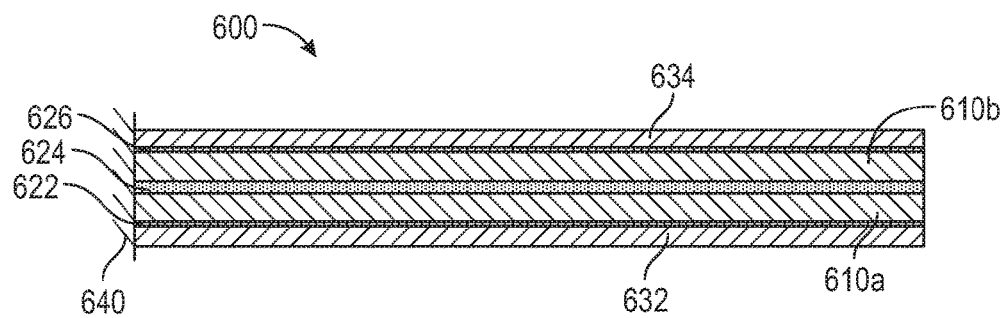
*FIG. 6A*
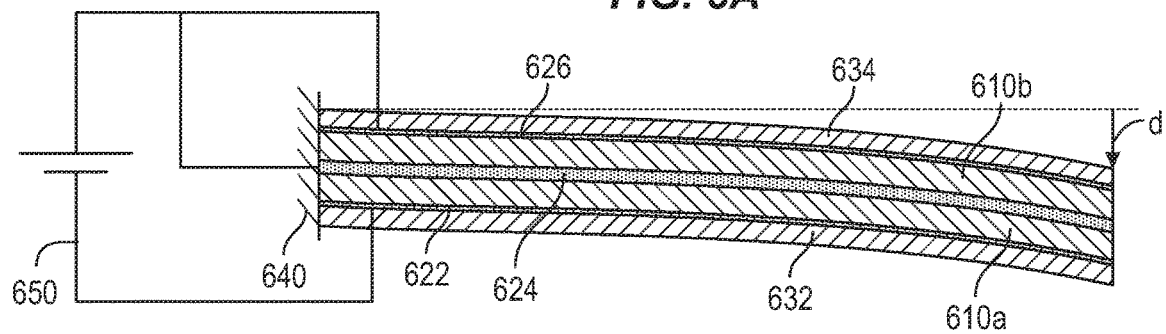
*FIG. 6B*

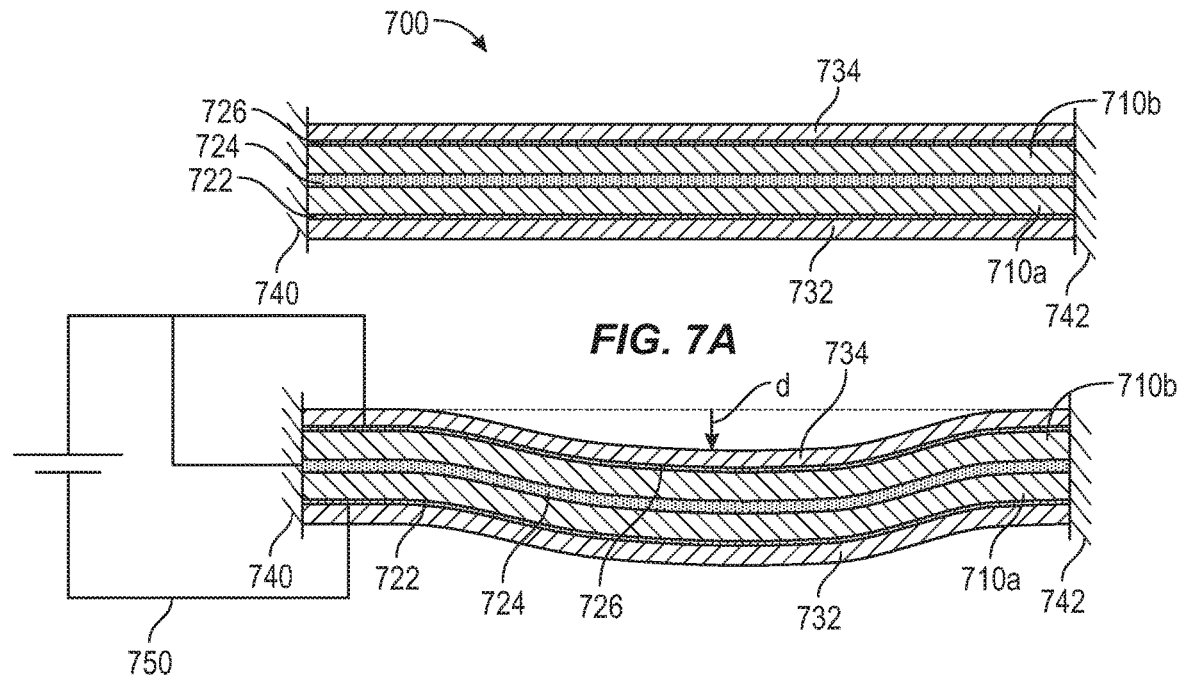
FIG. 7A
FIG. 7B
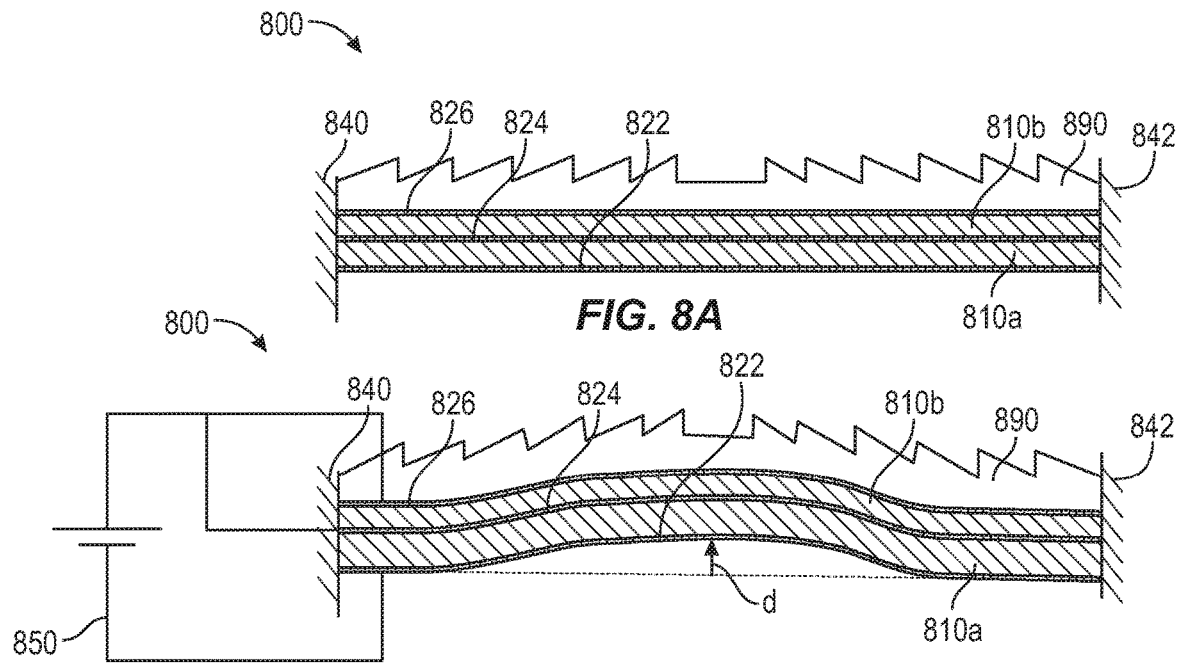
FIG. 8A
FIG. 8B

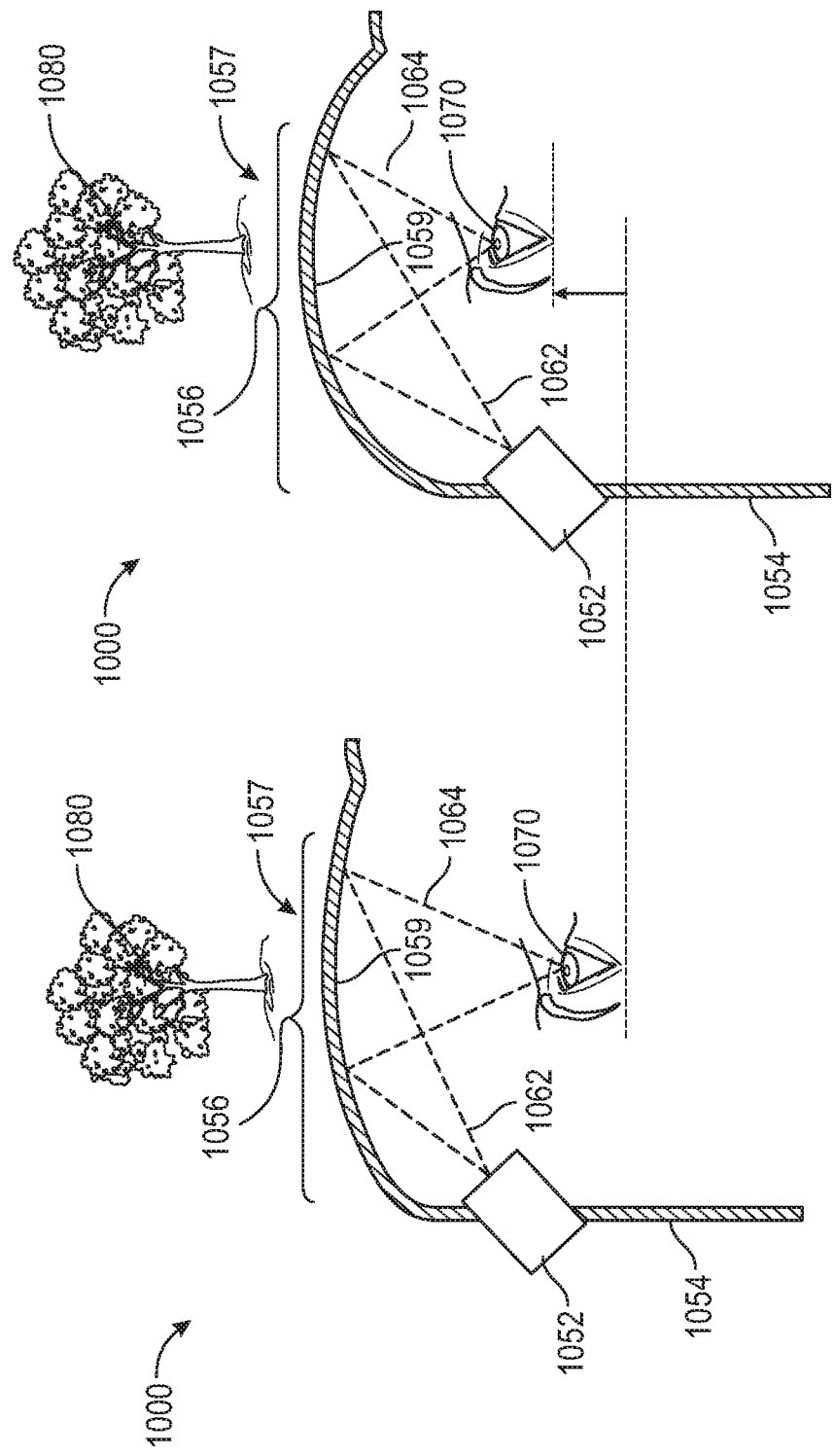

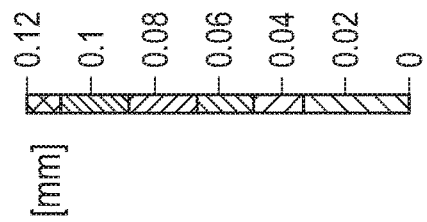
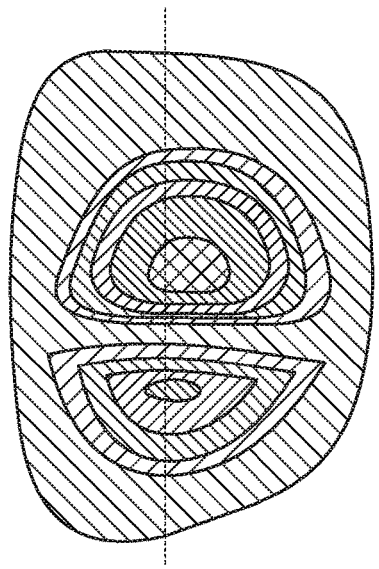
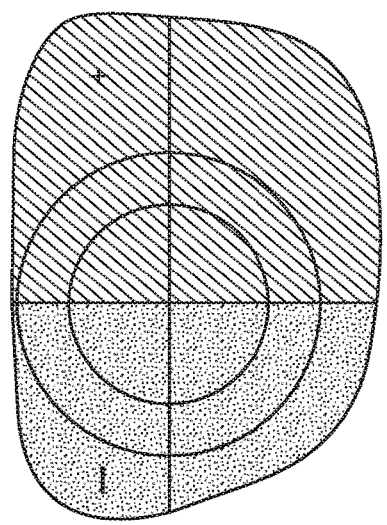
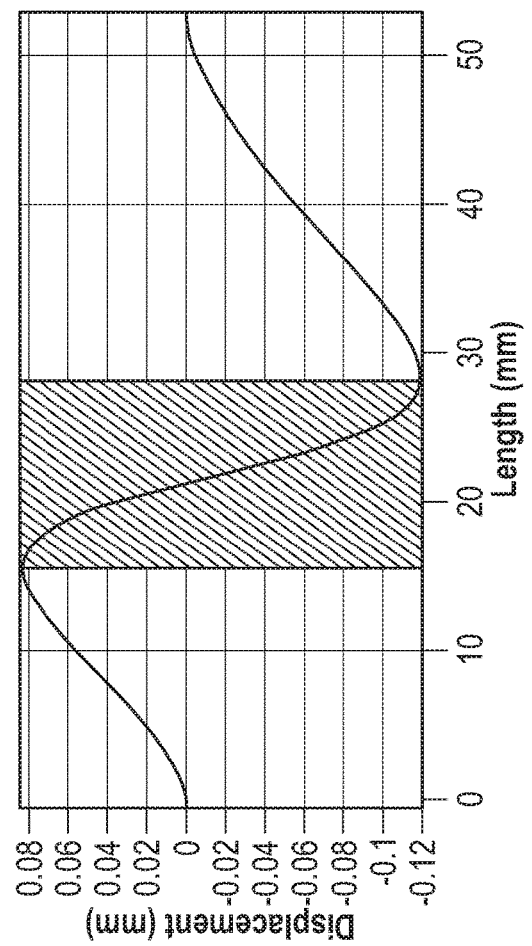
FIG. 12A
FIG. 12B
FIG. 12C

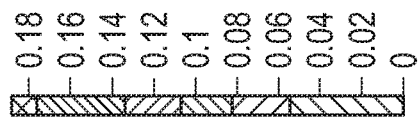
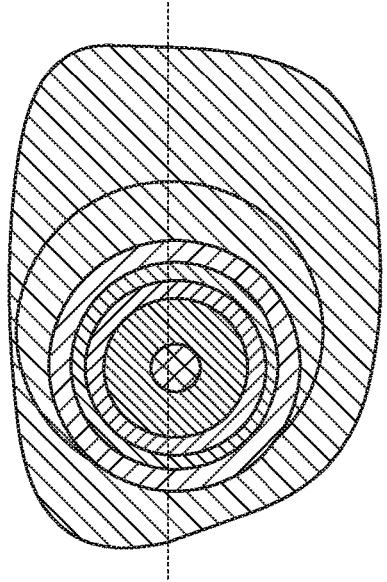
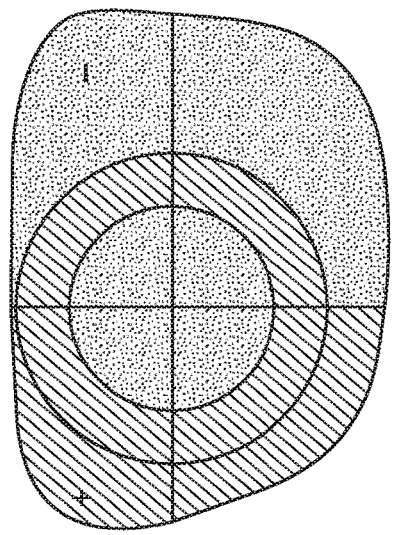
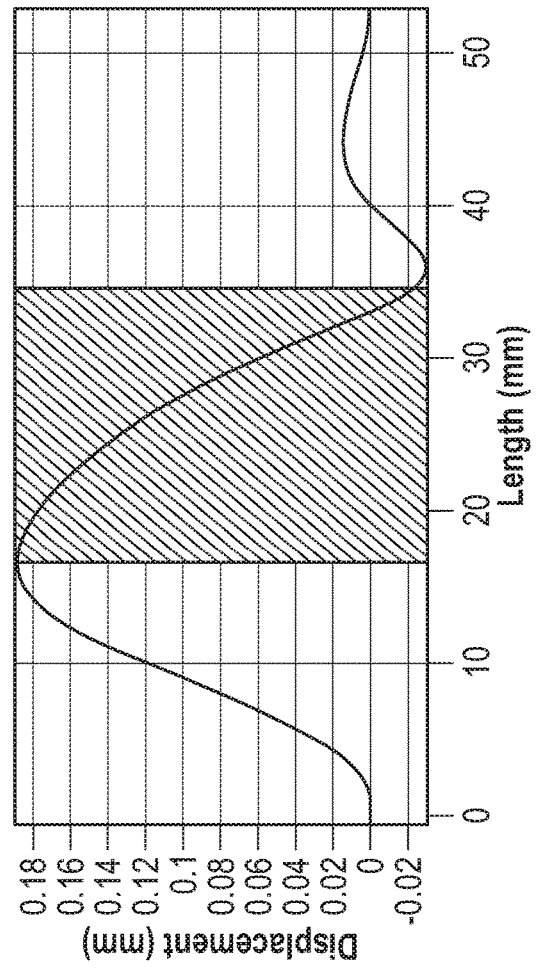
FIG. 13A
FIG. 13B
FIG. 13C

US 10,962,844 B1

ACTIVELY TUNABLE OPTICAL ELEMENT WITH FULL OR PARTIAL TRANSPARENCY

BACKGROUND

Polymeric and other dielectric materials may be incorporated into a variety of different optic and electro-optic device architectures, including active and passive optics and electroactive devices. Electroactive materials, including electroactive polymer (EAP) materials, for instance, may change their shape under the influence of an electric field. EAP materials have been investigated for use in various technologies, including actuation, sensing and/or energy harvesting. Lightweight and conformable, electroactive polymers may be incorporated into wearable devices such as haptic devices and are attractive candidates for emerging technologies including virtual reality/augmented reality devices where a comfortable, adjustable form factor is desired.

Virtual reality and augmented reality eyewear devices or headsets, for instance, may enable users to experience events, such as interactions with people in a computer-generated simulation of a three-dimensional world or viewing data superimposed on a real-world view. Virtual reality/augmented reality eyewear devices and headsets may also be used for purposes other than recreation. For example, governments may use such devices for military training, medical professionals may use such devices to simulate surgery, and engineers may use such devices as design visualization aids.

These and other applications may leverage one or more characteristics of thin film electroactive materials, including the Poisson's ratio to generate a lateral deformation (e.g., lateral expansion or contraction) as a response to compression between conductive electrodes. Example virtual reality/augmented reality assemblies containing electroactive layers may include deformable optics, such as mirrors, lenses, or adaptive optics. Deformation of the electroactive polymer may be used to actuate optical elements in an optical assembly, such as a lens system.

Although very thin layers of many electroactive polymers and piezoceramics can be highly transparent, the achievable force or displacement output may limit their use to an application space that can be outside of system functional requirements. Thus, notwithstanding recent developments, it would be advantageous to provide polymeric or other dielectric materials having improved actuation characteristics, including a controllable and sufficient deformation response in an optically transparent package.

SUMMARY

As will be described in greater detail below, the instant disclosure relates to tunable optical elements and methods for forming tunable optical elements. The optical elements may include a reflective or transparent electroactive material and may be incorporated into a variety of device architectures.

In accordance with certain embodiments, an optical element including an electroactive layer disposed between transparent electrodes may be incorporated into a variety of device architectures where capacitive actuation and the attendant strain realized in the electroactive layer (i.e., lateral expansion and compression in the direction of the applied electric field) may induce deformation in one or more adjacent active layers within the device and accordingly change the optical performance of the active layer(s). Lateral deformation may be essentially 1-dimensional, in the case of an anchored thin film architecture, or 2-dimensional. Example active layers include a volume hologram, a Fresnel layer, or a multi-layer stack forming a dichroic filter.

In some embodiments, the engineered deformation of two electroactive layers that are alternatively placed in expansion and compression by oppositely applied voltages may be used to induce bending or curvature changes in a device stack, which may be used to provide optical tuning such as focus or aberration control, for example. The electrodes may be used to affect large scale deformation, i.e., via full-area coverage, or the electrodes may be patterned to provide localized stress/strain profiles. A further application for the disclosed optical elements is beam steering. In particular embodiments, a deformable optical element and an electroactive layer are co-integrated whereby the deformable optic may itself be actuatable. In addition, various methods of forming the optical element are disclosed, including solution-based and solid-state deposition techniques.

According to certain embodiments, an optical element may be transparent and may include a primary electrode, a secondary electrode overlapping at least a portion of the primary electrode, and an electroactive layer disposed between and abutting the primary electrode and the secondary electrode. The optical element may have a first optical transmittance, a first refractive index, and a first optical path therethrough when a first voltage is applied between the primary electrode and the secondary electrode, and at least one of: a second optical transmittance different from the first optical transmittance, a second refractive index different from the first refractive index, and a second optical path through the optical element different from the first optical path when a second voltage different from the first voltage is applied between the primary electrode and the secondary electrode.

According to further embodiments, the applied voltage may change the orientation of dipoles within the electroactive layer (e.g., piezoelectric layer) such that the electroactive layer may have a first orientation of dipoles when the first voltage is applied between the primary electrode and the secondary electrode, and a second orientation of dipoles different from the first orientation when the second voltage is applied between the primary electrode and the secondary electrode.

The electroactive layer may include a polymer layer, such as a dielectric elastomer, a piezoelectric polymer, or an electrostrictive polymer. Example polymer materials include a PVDF homopolymer, a P(VDF-TrFE) co-polymer, a P(VDF-TrFE-CFE) ter-polymer, or a P(VDF-TrFE-CTFE) ter-polymer. In further embodiments, the electroactive layer may include a ceramic layer, such as a piezoelectric ceramic, an electrostrictive ceramic, a polycrystalline ceramic, or a single crystal ceramic. Example electroactive ceramics may include one or more perovskite ceramics.

The optical element may, in some embodiments, include a deformable layer. A deformable layer may include a material such as a gel, a foam, a liquid, a gas, or a deformable polymer. In certain embodiments, an electroactive layer may be pre-stressed and thus exhibit a non-zero stress state when zero voltage is applied between the primary electrode and the secondary electrode. In some embodiments, an optical element may be incorporated into a head-mounted display.

According to further embodiments, an optical device may include a transparent aperture and an optical element disposed within the aperture. The optical element may be configured to be reversibly actuated between a first state and a second state, the first state having a first transmissivity, a first refractive index, and a first optical path through the optical element, and the second state having at least one of a second transmissivity different from the first transmissivity, a second refractive index different from the first refractive index, and a second optical path through the optical element different from the first optical path. By way of example, the optical element may include a tunable lens having a geometry selected from prismatic, freeform, plano, meniscus, bi-convex, plano-convex, bi-concave, or plano-concave.

According to some embodiments, an optical device may include an optical stack disposed over the optical element, where the optical stack includes, from bottom to top, an integration layer, a photopolymer layer, and a liquid crystal layer. The liquid crystal layer may include a polarization volume hologram, for example. According to further embodiments, an optical stack may include, from bottom to top, an integration layer and a structured layer having a 2D or a 2.5D surface.

In optical elements having a multi-layer architecture, an optical element may include a tertiary electrode overlapping at least a portion of the secondary electrode, and a second electroactive layer disposed between and abutting the secondary electrode and the tertiary electrode. In an example device, one of the first electroactive layer and the second electroactive layer may be in a state of lateral compression while the other of the first electroactive layer and the second electroactive layer may be in a state of lateral expansion.

An example method includes forming a first electroactive layer over a primary electrode, forming a secondary electrode over the first electroactive layer to form an optical element, and applying a first voltage between the primary electrode and the secondary electrode to deform (i.e., actuate) the first electroactive layer so as to modify at least one of a transmissivity of the optical element, a refractive index of the optical element, and an optical path through the optical element.

According to some embodiments, the method may also include forming a second electroactive layer over the secondary electrode, forming a tertiary electrode over the second electroactive layer, and applying a second voltage between the secondary electrode and the tertiary electrode to deform the second electroactive layer. Such deformations may include placing one of the first electroactive layer and the second electroactive layer in a state of lateral compression while the other of the first electroactive layer and the second electroactive layer may be placed in a state of lateral expansion.

Actuation of an electroactive layer may be performed globally, i.e., over substantially an entire electroactive layer, or at least one electrode may be patterned to form a plurality of independent electrodes over the electroactive layer.

Features from any of these or other embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 3A shows a schematic cross-sectional view of a multi-layer active grating including an electroactive layer according to certain embodiments.

FIG. 3B shows a schematic cross-sectional view of the multi-layer active grating of FIG. 3A following capacitive actuation thereof according to some embodiments.

FIG. 4A shows a schematic cross-sectional view of a multi-layer active grating including an electroactive layer according to further embodiments.

FIG. 4B shows a schematic cross-sectional view of the multi-layer active grating of FIG. 4A following capacitive actuation according to certain embodiments.

FIG. 5A shows a schematic cross-sectional view of a multi-layer active dichroic filter including an electroactive layer according to further embodiments.

FIG. 5B shows a schematic cross-sectional view of the multi-layer active dichroic filter of FIG. 5A following capacitive actuation thereof according to certain embodiments.

FIG. 6A depicts a cross-sectional view of a multi-layer optical element having a deformation mode defined by a single fixed end according to some embodiments.

FIG. 6B depicts bending of the multi-layer optical element of FIG. 6A following actuation thereof according to some embodiments.

FIG. 7A depicts a cross-sectional view of a multi-layer optical element having a deformation mode defined by opposing fixed ends according to some embodiments.

FIG. 7B depicts buckling of the multi-layer optical element of FIG. 7A following actuation thereof according to some embodiments.

FIG. 8A shows a cross-sectional view of a Fresnel lens disposed over an optical element according to some embodiments.

FIG. 8B depicts the capacitive actuation of the optical element of FIG. 8A and the associated introduction of curvature to the Fresnel lens according to certain embodiments.

FIG. 10A schematically depicts a Maxwellian viewer for a head-mounted display including an optical element having an electroactive layer according to certain embodiments.

FIG. 10B depicts the Maxwellian viewer of FIG. 10A showing actuation of the optical element and an associated eye relief adjustment according to some embodiments.

FIG. 12A is a representation of a lens including an aperture and an optical element having patterned electrodes disposed within the aperture according to some embodiments.

FIG. 12B depicts the lens and optical element of FIG. 12A and implementation of active tip/tilt adjustment through selective actuation of the patterned electrodes according to various embodiments.

FIG. 12C is a plot of displacement versus distance with respect to an aperture active area according to certain embodiments.

FIG. 13A is a representation of a lens including an aperture and an optical element having patterned electrodes disposed within the aperture according to some embodiments.

FIG. 13B depicts the lens and optical element of FIG. 13A and implementation of active eye relief adjustment and active tip/tilt adjustment through selective actuation of the patterned electrodes according to various embodiments.

FIG. 13C is a plot of displacement versus distance with respect to an aperture active area according to certain embodiments.

Figure 1A:
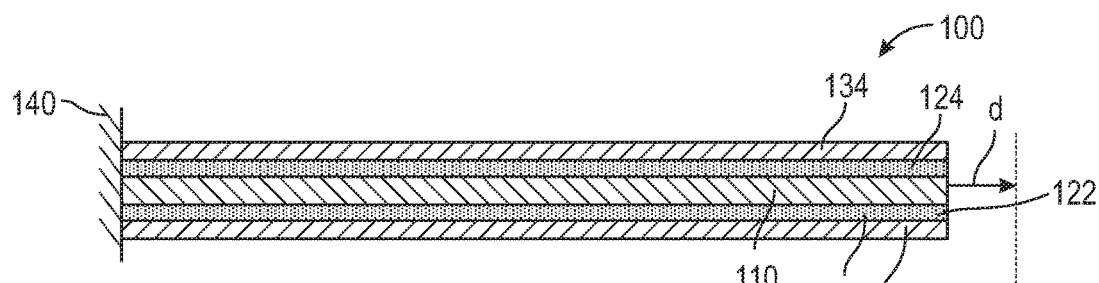
FIG. 1A depicts a cross-sectional view of an optical element including an electroactive layer and having a deformation mode defined by a single fixed end according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to optical elements, and more particularly to optical elements that include an electroactive layer. The electroactive layer may be capacitively actuated to deform an optical element and hence modify its optical performance. By way of example, the optical element may be located within the transparent aperture of an optical device such as a liquid lens, although the present disclosure is not particularly limited and may be applied in a broader context. By way of example, the optical element may be incorporated into an active grating, tunable lens, accommodative optical elements, or adaptive optics and the like. According to various embodiments, the optical element may be optically reflective or at least partially optically transparent.

In accordance with various embodiments, an optical element may include a primary electrode, a secondary electrode overlapping at least a portion of the primary electrode, and an electroactive layer disposed between and abutting the primary electrode and the secondary electrode, where the optical element is optically reflective or at least partially optically transparent. Actuation of the electroactive layer, e.g., by applying a voltage between the primary and secondary electrodes, may be used to alter one or more optical properties of the optical element, including optical transmittance, optical reflectance, refractive index, and the length of an optical path therethrough.

As used herein, a material or element that is "reflective" or "optically reflective" may, for example, have a transmissivity within the visible light spectrum of less than approximately 1%, e.g., less than 1, 0.5, 0.2, or 0.1%, including ranges between any of the foregoing values.

As used herein, a material or element that is "transparent" or "optically transparent" may, for example, have a transmissivity within the visible light spectrum of at least 50%, e.g., 50, 80, 90, 95, 97, 98, 99, or 99.5%, including ranges between any of the foregoing values, and less than approximately 80% haze, e.g., 1, 2, 5, 10, 20, 50, 60 or 70% haze, including ranges between any of the foregoing values. In accordance with some embodiments, a "fully transparent" material or element has a transmissivity (i.e., optical transmittance) within the visible light spectrum of at least approximately 80%, e.g., 80, 90, 95, 97, 98, 99, or 99.5%, including ranges between any of the foregoing values, and less than approximately 10% haze, e.g., 0, 1, 2, 4, 6, or 8% haze, including ranges between any of the foregoing values.

In some embodiments, actuation of an optical element may be used to vary its optical transmittance, i.e., from a first transmissivity in a first actuated state to a second transmissivity in a second actuated state. In a similar vein, according to further embodiments, actuation of an optical element may be used to vary its optical reflectance, i.e., from a first reflectivity in a first actuated state to a second reflectivity in a second actuated state.

In some embodiments, an applied voltage may induce a reorientation of dipoles within an electroactive (e.g., piezoelectric) layer, which can alter the transparency of the layer. Without wishing to be bound by theory, this effect may be accentuated at or above the coercive field for the piezoelectric material, which may be approximately equal to the magnitude of the applied electric field used for poling (i.e., dipole alignment). An optical element having such controllable transparency may be incorporated into a head-mounted display, for example.

The electroactive layer may include one or more electroactive materials.

Electroactive Materials

An optical element may include one or more electroactive materials, such as electroactive polymers or ceramics and may also include additional components. As used herein, "electroactive materials" may, in some examples, refer to materials that exhibit a change in size or shape when stimulated by an electric field. In some embodiments, an electroactive material may include a deformable polymer or ceramic that may be symmetric with regard to electrical charge (e.g., polydimethylsiloxane (PDMS), acrylates, etc.)

or asymmetric (e.g., poled polyvinylidene fluoride (PVDF) or its copolymers such as poly(vinylidenefluoride-co-trifluoroethylene) (PVDF-TrFE)). Further PVDF-based polymers may include poly(vinylidene fluoride-trifluoroethylene-chlorofluoroethylene (P(VDF-TrFE-CFE)) or poly(vinylidenefluoride-trifluoroethylene-chlorotrifluoroethylene (P(VDF-TrFE-CTFE)).

For piezoelectric polymers like PVDF homopolymer, the piezoelectric response may be tuned by altering the crystalline content and the crystalline orientation within the polymer matrix, e.g., by uniaxial or biaxial stretching, optionally followed by poling. The origin of piezoelectricity in PVDF homopolymer is believed to be the β-phase crystallite polymorph, which is the most electrically active and polar of the PVDF phases. Alignment of the β-phase structure may be used to achieve the desired piezoelectric effect. Poling may be performed to align the β-phase and enhance the piezoelectric response. Other piezoelectric polymers, such as PVDF-TrFE and PVDF-TrFE-CFE may be suitably oriented upon formation and the piezoelectric response of such polymers may be improved by poling with or without stretching.

Additional examples of materials forming electroactive polymers may include, without limitation, styrenes, polyesters, polycarbonates, epoxies, halogenated polymers, such as PVDF, copolymers of PVDF, such as PVDF-TrFE, silicone polymers, and/or any other suitable polymer or polymer precursor materials including ethyl acetate, butyl acrylate, octyl acrylate, ethylethoxy ethyl acrylate, 2-chloroethyl vinyl ether, chloromethyl acrylate, methacrylic acid, dimethacrylate oligomers, isocyanates, allyl glycidyl ether, N-methylol acrylamide, or mixtures thereof. Example acrylates may be free-radical initiated. Such materials may have any suitable dielectric constant or relative permittivity, such as, for example, a dielectric constant ranging from approximately 2 to approximately 30.

In the presence of an electrostatic field (E-field), an electroactive material may deform (e.g., compress, elongate, bend, etc.) according to the magnitude and direction of the applied field. Generation of such a field may be accomplished, for example, by placing the electroactive material between two electrodes, i.e., a primary electrode and a secondary electrode, each of which is at a different potential. As the potential difference (i.e., voltage difference) between the electrodes is increased (e.g., from zero potential) the amount of deformation may also increase, principally along electric field lines. This deformation may achieve saturation when a certain electrostatic field strength has been reached. With no electrostatic field, the electroactive material may be in its relaxed state undergoing no induced deformation, or stated equivalently, no induced strain, either internal or external.

The physical origin of the compressive nature of electroactive materials in the presence of an electrostatic field (E-field), being the force created between opposite electric charges, is that of the Maxwell stress, which is expressed mathematically with the Maxwell stress tensor. The level of strain or deformation induced by a given E-field is dependent on the square of the E-field strength, the dielectric constant of the electroactive material, and on the elastic compliance of the material in question. Compliance in this case is the change of strain with respect to stress or, equivalently, in more practical terms, the change in displacement with respect to force. In some embodiments, an electroactive layer may be pre-strained (or pre-stressed) to modify the stiffness of the optical element and hence its actuation characteristics.

In some embodiments, an electroactive polymer may include an elastomer. As used herein, an "elastomer" may, in some examples, refer to a material having viscoelasticity (i.e., both viscosity and elasticity), relatively weak intermolecular forces, and generally low elastic modulus (a measure of the stiffness of a solid material) and a high strain-to-failure compared with other materials. In some embodiments, an electroactive polymer may include an elastomer material that has an effective Poisson's ratio of less than approximately 0.35 (e.g., less than approximately 0.3, less than approximately 0.25, less than approximately 0.2, less than approximately 0.15, less than approximately 0.1, or less than approximately 0.05). In at least one example, the elastomer material may have an effective density that is less than approximately 90% (e.g., less than approximately 80%, less than approximately 70%, less than approximately 60%, less than approximately 50%, less than approximately 40%) of the elastomer when densified (e.g., when the elastomer is compressed, for example, by electrodes to make the elastomer more dense).

In some embodiments, the term "effective density," as used herein, may refer to a parameter that may be obtained using a test method where a uniformly thick layer of an electroactive ceramic or polymer, e.g., elastomer, may be placed between two flat and rigid circular plates. In some embodiments, the diameter of the electroactive material being compressed may be at least 100 times the thickness of the electroactive material. The diameter of the electroactive layer may be measured, then the plates may be pressed together to exert a pressure of at least approximately $1 \times 10^6$ Pa on the electroactive layer, and the diameter of the layer is remeasured. The effective density may be determined from an expression ($DR=D_{uncompressed}/D_{compressed}$), where DR may represent the effective density ratio, $D_{uncompressed}$ may represent the density of the uncompressed electroactive layer, and $D_{compressed}$ may represent the density of the uncompressed electroactive layer.

In some embodiments, the optical elements described herein may include an elastomeric electroactive polymer having an effective Poisson's ratio of less than approximately 0.35 and an effective uncompressed density that is less than approximately 90% of the elastomer when densified. In some embodiments, the term "effective Poisson's ratio" may refer to the negative of the ratio of transverse strain (e.g., strain in a first direction) to axial strain (e.g., strain in a second direction) in a material.

Electrodes

In some embodiments, optical elements may include paired electrodes, which allow the creation of the electrostatic field that forces constriction of the electroactive layer. In some embodiments, an "electrode," as used herein, may refer to a conductive material, which may be in the form of a thin film or a layer. Electrodes may include relatively thin, electrically conductive metals or metal alloys and may be of a non-compliant or compliant nature.

In some embodiments, the electrodes may include a metal such as aluminum, gold, silver, tin, copper, indium, gallium, zinc, alloys thereof, and the like. An electrode may include one or more electrically conductive materials, such as a metal, a semiconductor (such as a doped semiconductor), carbon nanotubes, graphene, carbon black, transparent conductive oxides (TCOs, e.g., indium tin oxide (ITO), zinc oxide (ZnO), etc.), or other electrically conducting material.

In some embodiments, the electrode or electrode layer may be self-healing, such that damage from local shorting of a circuit can be isolated. Suitable self-healing electrodes may include thin films of metals, such as, for example, aluminum.

In some embodiments, a primary electrode may overlap (e.g., overlap in a parallel direction) at least a portion of a secondary electrode. The primary and secondary electrodes may be generally parallel and spaced apart and separated by a layer of electroactive material. A tertiary electrode may overlap at least a portion of either the primary or secondary electrode.

An optical element may include a first electroactive layer (e.g., elastomer material) which may be disposed between a first pair of electrodes (e.g., the primary electrode and the secondary electrode). A second optical element, if used, may include a second electroactive layer and may be disposed between a second pair of electrodes. In some embodiments, there may be an electrode that is common to both the first pair of electrodes and the second pair of electrodes.

In some embodiments, one or more electrodes may be optionally electrically interconnected, e.g., through a contact layer, to a common electrode. In some embodiments, an optical element may have a first common electrode, connected to a first plurality of electrodes, and a second common electrode, connected to a second plurality of electrodes. In some embodiments, electrodes (e.g., one of a first plurality of electrodes and one of a second plurality of electrodes) may be electrically isolated from each other using an insulator, such as a dielectric layer. An insulator may include a material without appreciable electrical conductivity, and may include a dielectric material, such as, for example, an acrylate or silicone polymer.

In some embodiments, a common electrode may be electrically coupled (e.g., electrically contacted at an interface having a low contact resistance) to one or more other electrode(s), e.g., a secondary electrode and a tertiary electrode located on either side of a primary electrode.

In some embodiments, electrodes may be flexible and/or resilient and may stretch, for example elastically, when an optical element undergoes deformation. In this regard, electrodes may include one or more transparent conducting oxides (TCOs) such as indium oxide, tin oxide, indium tin oxide (ITO) and the like, graphene, carbon nanotubes, etc. In other embodiments, relatively rigid electrodes (e.g., electrodes including a metal such as aluminum) may be used.

In some embodiments, the electrodes (e.g., the primary electrode and the secondary electrode) may have a thickness of approximately 1 nm to approximately 1000 nm, with an example thickness of approximately 10 nm to approximately 50 nm. A thickness of an electrode that includes a self-healing property (e.g., an aluminum electrode) may be approximately 20 nm. In some embodiments, a common electrode may have a sloped shape, or may be a more complex shape (e.g., patterned or freeform). In some embodiments, a common electrode may be shaped to allow compression and expansion of an optical element or device during operation.

The electrodes in certain embodiments may have an optical transmissivity of at least approximately 50%, e.g., approximately 50%, approximately 60%, approximately 70%, approximately 80%, approximately 90%, approximately 95%, approximately 97%, approximately 98%, approximately 99%, or approximately 99.5%, including ranges between any of the foregoing values.

In some embodiments, the electrodes described herein (e.g., the primary electrode, the secondary electrode, or any other electrode including any common electrode) may be fabricated using any suitable process. For example, the electrodes may be fabricated using physical vapor deposition (PVD), chemical vapor deposition (CVD), evaporation, spray-coating, spin-coating, screen printing, atomic layer deposition (ALD), and the like. In further aspects, the electrodes may be manufactured using a thermal evaporator, a sputtering system, stamping, and the like.

In some embodiments, a layer of electroactive material may be deposited directly on to an electrode. In some embodiments, an electrode may be deposited directly on to the electroactive material. In some embodiments, electrodes may be prefabricated and attached to an electroactive material. In some embodiments, an electrode may be deposited on a substrate, for example a glass substrate or flexible polymer film. In some embodiments, the electroactive material layer may directly abut an electrode. In some embodiments, there may be a dielectric layer, such as an insulating layer, between a layer of electroactive material and an electrode. Any suitable combination of processes may be used.

Optical Elements

In some applications, an optical element used in connection with the principles disclosed herein may include a primary electrode, a secondary electrode, and an electroactive layer disposed between the primary electrode and the secondary electrode.

In some embodiments, there may be one or more additional electrodes, and a common electrode may be electrically coupled to one or more of the additional electrodes. For example, optical elements may be disposed in a stacked configuration, with a first common electrode coupled to a first plurality of electrodes, and a second common electrode electrically connected to a second plurality of electrodes. The first and second pluralities may alternate in a stacked configuration, so that each optical element is located between one of the first plurality of electrodes and one of the second plurality of electrodes.

In some embodiments, an optical element (e.g., including primary and secondary electrode and an intervening electroactive layer) may have a thickness of approximately 10 nm to approximately 10 μm (e.g., approximately 10 nm, approximately 20 nm, approximately 30 nm, approximately 40 nm, approximately 50 nm, approximately 60 nm, approximately 70 nm, approximately 80 nm, approximately 90 nm, approximately 100 nm, approximately 200 nm, approximately 300 nm, approximately 400 nm, approximately 500 nm, approximately 600 nm, approximately 700 nm, approximately 800 nm, approximately 900 nm, approximately 1 μm, approximately 2 μm, approximately 3 μm, approximately 4 μm, approximately 5 μm, approximately 6 μm, approximately 7 μm, approximately 8 μm, approximately 9 μm, approximately 10 μm), with an example thickness of approximately 200 nm to approximately 500 nm.

The application of a voltage between the electrodes can cause compression of the intervening electroactive layer(s) in the direction of the applied electric field and an associated expansion or contraction of the electroactive layer(s) in one or more transverse dimensions. In some embodiments, an applied voltage (e.g., to the primary electrode and/or the secondary electrode) may create at least approximately 0.1% strain (e.g., an amount of deformation in the direction of the applied force resulting from the applied voltage divided by the initial dimension of the material) in the electroactive element(s) in at least one direction (e.g., an x, y, or z direction with respect to a defined coordinate system).

In some embodiments, the electroactive response may include a mechanical response to the electrical input that varies over the spatial extent of the device, with the electrical input being applied between the primary electrode and the secondary electrode. The mechanical response may be termed an actuation, and example devices may be, or include, actuators.

The optical element may be deformable from an initial state to a deformed state when a first voltage is applied between the primary electrode and the secondary electrode and may further be deformable to a second deformed state when a second voltage is applied between the primary electrode and the secondary electrode.

An electrical signal may include a potential difference, which may include a direct or alternating voltage. In some embodiments, the frequency may be higher than the highest mechanical response frequency of the device, so that deformation may occur in response to the applied RMS electric field but with no appreciable oscillatory mechanical response to the applied frequency. The applied electrical signal may generate non-uniform constriction of the electroactive layer between the primary and secondary electrodes. A non-uniform electroactive response may include a curvature of a surface of the optical element, which may in some embodiments be a compound curvature.

In some embodiments, an optical element may have a maximum thickness in an undeformed state and a compressed thickness in a deformed state. In some embodiments, an optical element may have a density in an undeformed state that is approximately 90% or less of a density of the optical element in the deformed state. In some embodiments, an optical element may exhibit a strain of at least approximately 0.1% when a voltage is applied between the primary electrode and the secondary electrode.

In some embodiments, an optical device may include one or more optical elements, and an optical element may include one or more electroactive layers. In various embodiments, an optical element may include a primary electrode, a secondary electrode overlapping at least a portion of the primary electrode, and an electroactive layer disposed between the primary electrode and the secondary electrode.

In some embodiments, the application of an electric field over an entirety of an electroactive layer may generate substantially uniform deformation between the primary and secondary electrodes. In some embodiments, the primary electrode and/or the secondary electrode may be patterned, allowing a localized electric field to be applied to a portion of the optical element, for example, to provide a localized deformation.

An optical device may include a plurality of stacked elements. For example, each element may include an electroactive layer disposed between a pair of electrodes. In some embodiments, an electrode may be shared between elements; for example, a device may have alternating electrodes and an electroactive layer located between neighboring pairs of electrodes. Various stacked configurations can be constructed in different geometries that alter the shape, alignment, and spacing between elements. Such complex arrangements can enable compression, extension, twisting, and/or bending when operating such an actuator.

In some embodiments, an optical device may include additional elements interleaved between electrodes, such as in a stacked configuration. For example, electrodes may form an interdigitated stack of electrodes, with alternate electrodes connected to a first common electrode and the remaining alternate electrodes connected to a second common electrode. An additional optical element may be disposed on the other side of a primary electrode. The additional optical element may overlap a first optical element. An additional electrode may be disposed abutting a surface of any additional optical element.

In some embodiments, an optical device may include more (e.g., two, three, or more) such additional electroactive layers and corresponding electrodes. For example, an optical device may include a stack of two or more optical elements and corresponding electrodes. For example, an optical device may include between 2 optical elements to approximately 5, approximately 10, approximately 20, approximately 30, approximately 40, approximately 50, approximately 100, approximately 200, approximately 300, approximately 400, approximately 500, approximately 600, approximately 700, approximately 800, approximately 900, approximately 1000, approximately 2000, or greater than approximately 2000 optical elements.

Fabrication of Optical Elements

Various fabrication methods are discussed herein. As will be appreciated by one skilled in the art, the disclosed fabrication methods may be used to form one or more layers or features within an optical element, including organic (i.e., polymeric) and inorganic (i.e., ceramic) electroactive materials, and transparent conductive electrodes disposed adjacent to such electroactive materials. In certain embodiments, the structure and properties of an optical element may be varied, e.g., across a spatial extent, by varying one or more process parameters, such as wavelength, intensity, substrate temperature, other process temperature, gas pressure, radiation dosage, chemical concentration gradients, chemical composition variations, or other process parameter.

According to some embodiments, deposition methods, including spin-coating, screen printing, inkjet printing, evaporation, chemical vapor deposition, vapor coating, physical vapor deposition, thermal spraying, extrusion, hydrothermal synthesis, Czochralski growth, isostatic pressing, lamination, etc., may be used to form an electroactive layer and/or electrode. In certain embodiments, an electroactive layer may be deposited directly onto an electrode. In alternate embodiments, an electroactive layer may be deposited onto a provisional substrate and transferred to an electrode or an electroded substrate.

In some embodiments, an electroactive layer or an electrode may be fabricated on a surface enclosed by a deposition chamber, which may be evacuated (e.g., using one or more mechanical vacuum pumps to a predetermined level such as $10^{-6}$ Torr or below). A deposition chamber may include a rigid material (e.g., steel, aluminum, brass, glass, acrylic, and the like). A surface used for deposition may include a rotating drum. In some embodiments, the rotation may generate centrifugal energy and cause the deposited material to spread more uniformly over any underlying sequentially deposited materials (e.g., electrodes, polymer elements, ceramic elements, and the like) that are mechanically coupled (e.g., bonded) to the surface. In some embodiments, the surface may be fixed and the deposition and curing systems may move relative to the surface, or both the surface, the deposition, and/or curing systems may be moving simultaneously.

In some embodiments, a deposition chamber may have an exhaust port configured to open to release at least a portion of reaction by-products, as well as monomers, oligomers, monomer initiators, conductive materials, etc. associated with the formation of one or more material layers. In some embodiments, a deposition chamber may be purged (e.g., with a gas or the application of a vacuum, or both) to remove such materials. Thereafter, one or more of the previous steps may be repeated (e.g., for a second optical element, and the like). In this way, individual layers of an optical element may be maintained at high purity levels.

In some embodiments, the deposition of the materials (e.g., monomers, oligomers, monomer initiators, conductive materials, etc.) of the optical element may be performed using a deposition process, such as chemical vapor deposition (CVD). CVD may refer to a vacuum deposition method used to produce high-quality, high-performance, solid materials. In CVD, a substrate may be exposed to one or more precursors, which may react and/or decompose on the substrate surface to produce the desired deposit (e.g., one or more electrodes, electroactive polymer layers, etc.). Frequently, volatile by-products are also produced, which may be removed by gas flow through the chamber.

In some embodiments, methods for fabricating an optical element (e.g., an actuator) may include masks (e.g., shadow masks) to control the patterns of one or more deposited materials.

Methods of forming an optical element include forming electrodes and an electroactive layer sequentially (e.g., via vapor deposition, coating, printing, etc.) or simultaneously (e.g., via co-flowing, coextrusion, slot die coating, etc.). By way of example, an electroactive layer may be deposited using initiated chemical vapor deposition (iCVD), where suitable monomers of the desired polymers may be used to form the desired coating. According to a further example, a co-extrusion process having a high drawing ratio may enable the formation of plural thin layers (e.g., electroactive layers and electrode layers), which may be used to form a multimorph architecture from a larger billet of electroactive, conductive, and optionally passive support materials. Alternatively, the electroactive layers may be extruded individually.

A method of fabricating an optical element may include depositing a curable material onto a primary electrode, curing the deposited curable material to form an electroactive layer (e.g., including a cured elastomer material) and depositing an electrically conductive material onto a surface of the electroactive layer opposite the primary electrode to form a secondary electrode. In some embodiments, a method may further include depositing an additional curable material onto a surface of the secondary electrode opposite the electroactive layer, curing the deposited additional curable material to form a second electroactive layer including a second cured elastomer material, and depositing an additional electrically conductive material onto a surface of the second electroactive layer opposite the secondary electrode to form a tertiary electrode.

In some embodiments, a method of fabricating an optical element may include vaporizing a curable material, or a precursor thereof, where depositing the curable material may include depositing the vaporized curable material onto a primary electrode. In some embodiments, a method of fabricating an optical element may include printing the polymer or precursor thereof (such as a curable material) onto an electrode. In some embodiments, a method may also include combining a polymer precursor material with at least one other component to form a deposition mixture. In some embodiments, a method may include combining a curable material with particles of a material having a high dielectric constant to form a deposition mixture.

According to some embodiments, a method may include positioning a curable material between a first electrically conductive material or layer and a second electrically conductive material or layer. The positioned curable material may be cured to form a cured elastomer material. In some embodiments, the cured elastomer material may have a Poisson's ratio of approximately 0.35 or less. In some embodiments, at least one of the first electrically conductive material or the second electrically conductive material may include a curable electrically conductive material, and the method may further include curing the at least one of the first electrically conductive material or the second electrically conductive material to form an electrode. In this example, curing the at least one of the first electrically conductive material or the second electrically conductive material may include curing the at least one of the first electrically conductive material or the second electrically conductive material during curing of the positioned curable material.

In some embodiments, a curable material and at least one of a first electrically conductive material or a second electrically conductive material may be flowable during positioning of the curable material between the primary and secondary electrodes. A method of fabricating an optical element may further include flowing a curable material and at least one of the first electrically conductive material or the second electrically conductive material simultaneously onto a substrate.

In some embodiments, an optical element (e.g., actuator) may be fabricated by providing an electrically conductive layer (e.g., a primary electrode) having a first surface, depositing (e.g., vapor depositing) an electroactive layer or precursor layer onto the primary electrode, and depositing another electrically conductive layer (e.g., a secondary electrode) onto the electroactive (or precursor) layer. In some embodiments, the method may further include repeating one or more of the above to fabricate additional layers (e.g., a second optical element, other electrodes, alternating stacks of electroactive layers and electrodes, and the like. An optical device may have a stacked configuration.

In some embodiments, an optical element may be fabricated by first depositing a primary electrode, and then depositing a curable material (e.g., a monomer) on the primary electrode (e.g., deposited using a vapor deposition process). In some embodiments, an inlet to a deposition chamber may open and may input an appropriate monomer initiator for starting a chemical reaction. In some embodiments, "monomer," as used herein, may refer to a monomer that forms a given polymer (i.e., as part of an electroactive element). In other examples, polymerization of a polymer precursor (such as a monomer) may include exposure to electromagnetic radiation (e.g., visible, UV, x-ray or gamma radiation), exposure to other radiation (e.g., electron beams, ultrasound), heat, exposure to a chemical species (such as a catalyst, initiator, and the like), or some combination thereof.

Deposited curable material may be cured with a source of radiation (e.g., electromagnetic radiation, such as UV and/or visible light) to form an electroactive polymer layer that includes a cured elastomer material, for example by photopolymerization. In some embodiments, a radiation source may include an energized array of filaments that may generate electromagnetic radiation, a semiconductor device such as a light-emitting diode (LED) or semiconductor laser, other laser, fluorescence or an optical harmonic generation source, and the like. A monomer and an initiator (if used) may react upon exposure to radiation to form an electroactive element.

In some embodiments, radiation may include radiation having an energy (e.g., intensity and/or photon energy) capable of breaking covalent bonds in a material. Radiation examples may also include electrons, electron beams, ions (such as protons, nuclei, and ionized atoms), x-rays, gamma rays, ultraviolet light, visible light, or other radiation, e.g., having appropriately high energy levels.

In some embodiments, an optical element may be fabricated using an atmospheric pressure CVD (APCVD) coating formation technique (e.g., CVD at atmospheric pressure). In some embodiments, an optical element may be fabricated using a low-pressure CVD (LPCVD) process (e.g., CVD at sub-atmospheric pressures). In some embodiments, LPCVD may make use of reduced pressures that may reduce unwanted gas-phase reactions and improve the deposited material's uniformity across a substrate. In one aspect, a fabrication apparatus may apply an ultrahigh vacuum CVD (UHVCVD) process (e.g., CVD at very low pressure, typically below approximately $10^{-6}$ Pa (equivalently, approximately $10^{-8}$ torr)).

In some embodiments, an optical element may be fabricated using an aerosol assisted CVD (AACVD) process (e.g., a CVD process in which the precursors are transported to the substrate by means of a liquid/gas aerosol), which may be generated ultrasonically or with electrospray. In some embodiments, AACVD may be used with non-volatile precursors. In some embodiments, an optical element may be fabricated using a direct liquid injection CVD (DLI-CVD) process (e.g., a CVD process in which the precursors are in liquid form, for example, a liquid or solid dissolved in a solvent). Liquid solutions may be injected in a deposition chamber using one or more injectors. Precursor vapors may then be transported as in CVD. DLI-CVD may be used on liquid or solid precursors, and high growth rates for the deposited materials may be achieved using this technique.

In some embodiments, an optical element may be fabricated using a hot wall CVD process (e.g., CVD in which the deposition chamber is heated by an external power source and the deposited layer(s) are heated by radiation from the heated wall of the deposition chamber). In another aspect, an optical element may be fabricated using a cold wall CVD process (e.g., a CVD in which only the device is directly heated, for example, by induction, while the walls of the chamber are maintained at room temperature).

In some embodiments, an optical element may be fabricated using a microwave plasma-assisted CVD (MPCVD) process, where microwaves are used to enhance chemical reaction rates of the precursors. In another aspect, an optical element may be fabricated using a plasma-enhanced CVD (PECVD) process (e.g., CVD that uses plasma to enhance chemical reaction rates of the precursors). In some embodiments, PECVD processing may allow deposition of materials at lower temperatures, which may be useful in withstanding damage to the device or in depositing certain materials (e.g., organic materials and/or some polymers).

In some embodiments, an optical element may be fabricated using a remote plasma-enhanced CVD (RPECVD) process. In some embodiments, RPECVD may be similar to PECVD except that the optical element or device may not be directly in the plasma discharge region. In some embodiments, the removal of the electroactive device from the plasma region may allow for the reduction of processing temperatures down to approximately room temperature (i.e., approximately 23° C.).

In some embodiments, an optical element may be fabricated using an atomic-layer CVD (ALCVD) process. In some embodiments, ALCVD may deposit successive layers of different substances to produce layered, crystalline thin films.

In some embodiments, an optical element may be fabricated using a combustion chemical vapor deposition (CCVD) process. In some embodiments, CCVD (also referred to as flame pyrolysis) may refer to an open-atmosphere, flame-based technique for depositing high-quality thin films (e.g., layers of material ranging from fractions of a nanometer (monolayer) to several micrometers in thickness).

In some embodiments, an optical element may be fabricated using a hot filament CVD (HFCVD) process, which may also be referred to as catalytic CVD (cat-CVD) or initiated CVD (iCVD). In some embodiments, this process may use a hot filament to chemically decompose source gases to form the materials of the device. Moreover, the filament temperature and temperature of portions of the deposited layer may be independently controlled, allowing colder temperatures for better adsorption rates at the growth surface, and higher temperatures necessary for decomposition of precursors to free radicals at the filament.

In some embodiments, an optical element may be fabricated using a hybrid physical-chemical vapor deposition (HPCVD) process. HPCVD may involve both chemical decomposition of precursor gas and vaporization of a solid source to form the materials of the optical element.

In some embodiments, an optical element may be fabricated using a metalorganic chemical vapor deposition (MOCVD) process (e.g., a CVD method that uses metalorganic precursors to form one or more layers of an optical element). For example, an electrode may be formed on an electroactive layer using this approach.

In some embodiments, an optical element may be fabricated using a rapid thermal CVD (RTCVD) process. This CVD process uses heating lamps or other methods to rapidly heat the optical element. Heating only the optical element during fabrication thereof rather than the precursors or chamber walls may reduce unwanted gas-phase reactions that may lead to particle formation in one or more layers of the optical element.

In some embodiments, an optical element may be fabricated using a photo-initiated CVD (PICVD) process. This process may use UV light to stimulate chemical reactions in the precursor materials used to make the materials for the optical element. Under certain conditions, PICVD may be operated at or near atmospheric pressure.

In some embodiments, optical elements may be fabricated by a process including depositing a curable material (e.g., a monomer such as an acrylate or a silicone) and a solvent for the curable material onto a substrate, heating the curable material with at least a portion of the solvent remaining with the cured monomer, and removing the solvent from the cured monomer.

In some embodiments, a flowable material (e.g., a solvent) may be combined with the curable materials (e.g., monomers and conductive materials) to create a flowable mixture that may be used for producing electroactive polymers. The monomers may be monofunctional or polyfunctional, or mixtures thereof. Polyfunctional monomers may be used as crosslinking agents to add rigidity or to form elastomers. Polyfunctional monomers may include difunctional materials such as bisphenol fluorene (EO) diacrylate, trifunctional materials such as trimethylolpropane triacrylate (TMPTA), and/or higher functional materials. Other types of monomers may be used, including, for example, isocyanates, and these may be mixed with monomers with different curing mechanisms.

In some embodiments, the flowable material may be combined (e.g., mixed) with a curable material. In some embodiments, a curable material may be combined with at least one non-curable component (e.g., particles of a material having a high dielectric constant) to form a mixture including the curable material and the at least one non-curable component, for example, on an electrode (e.g., a primary electrode or a secondary electrode). Alternatively, the flowable material (e.g., solvent) may be introduced into a vaporizer to deposit (e.g., via vaporization or, in alternative embodiments, via printing) a curable material onto an electrode. In some embodiments, a flowable material (e.g., solvent) may be deposited as a separate layer either on top or below a curable material (e.g., a monomer) and the solvent and curable material may be allowed to inter-diffuse before being cured by a source of radiation to generate an electroactive polymer.

In some embodiments, after the curable material is cured, the solvent may be allowed to evaporate before another electroactive layer or another electrode is formed. In some embodiments, the evaporation of the solvent may be accelerated by the application of heat to the surface with a heater, which may, for example, be disposed within a drum forming surface and/or any other suitable location, or by reducing the pressure of the solvent above the substrate using a cold trap (e.g., a device that condenses vapors into a liquid or solid), or a combination thereof.

In some embodiments, the solvent may have a vapor pressure that is similar to at least one of the monomers being evaporated. The solvent may dissolve both the monomer and the generated electroactive polymer, or the solvent may dissolve only the monomer. Alternatively, the solvent may have low solubility for the monomer, or plurality of monomers if there is a mixture of monomers being applied. Furthermore, the solvent may be immiscible with at least one of the monomers and may at least partially phase separate when condensed on the substrate.

In some embodiments, there may be multiple vaporizers, with each of the multiple vaporizers applying a different material, including solvents, non-solvents, monomers, and/or ceramic precursors such as tetraethyl orthosilicate and water, and optionally a catalyst, such as HCl or ammonia, for forming a sol-gel, for example.

In some embodiments, a method of generating an electroactive layer for use in connection with an optical element (such as reflective or transparent actuators described variously herein) may include co-depositing a monomer or mixture of monomers, a surfactant, and a non-solvent material associated with the monomer(s) that is compatible with the surfactant.

In various examples, the monomer(s) may include, but not be limited to, ethyl acrylate, butyl acrylate, octyl acrylate, ethoxy ethyl acrylate, 2-chloroethyl vinyl ether, chloromethyl acrylate, methacrylic acid, allyl glycidyl ether, and/or N-methylol acrylamide.

In some aspects, the surfactant may be ionic or non-ionic (for example SPAN 80, available from Sigma-Aldrich Company). In another aspect, the non-solvent material may include organic and/or inorganic non-solvent materials. For instance, the non-solvent material may include water or a hydrocarbon or may include a highly polar organic compound such as ethylene glycol. As noted, the monomer or monomers, non-solvent, and surfactant may be co-deposited. Alternatively, the monomer or monomers, non-solvent, and/or surfactant may be deposited sequentially.

In one aspect, a substrate temperature may be controlled to generate and control one or more properties of the resulting emulsion generated by co-depositing or sequentially depositing the monomer or monomers, non-solvent, and surfactant. The substrate may be treated to prevent destabilization of the emulsion. For example, an aluminum layer may be coated with a thin polymer layer made by depositing a monomer followed by curing the monomer. In accordance with various embodiments, a substrate may include an electrode (e.g., a primary electrode or a secondary electrode).

A curing agent, if provided, may include polyamines, higher fatty acids or their esters, sulfur, or a hydrosilylation catalyst, for example. In some embodiments, a mixture of curable monomers with cured polymers may be used. Furthermore, stabilizers may be used, for example, to inhibit environmental degradation of the electroactive polymer. Example stabilizers include antioxidants, light stabilizers and heat stabilizers.

Ceramic electroactive materials, such as single crystal piezoelectric materials, may be formed using hydrothermal processing or a Czochralski method to produce an oriented ingot, which may be cut along a specified crystal plane to produce wafers having a desired crystalline orientation. A wafer may be thinned, e.g., via lapping, or polished, and transparent electrodes may be formed directly on the wafer, e.g., using chemical vapor deposition or a physical vapor deposition process such as sputtering or evaporation. Optionally, the electroactive ceramic may be poled to achieve a desired dipole alignment.

In addition to the foregoing, polycrystalline piezoelectric materials may be formed, e.g., by powder processing. Densely-packed networks of high purity, ultrafine polycrystalline particles can be highly transparent and may be more mechanically robust in thin layers than their single crystal counterparts. For instance, optical grade PLZT having >99.9% purity may be formed using sub-micron (e.g., <2 μm) particles. In this regard, substitution via doping of $Pb^{2+}$ at A and B-site vacancies with $La^{2+}$ and/or $Ba^{2+}$ may be used to increase the transparency of perovskite ceramics such as PZN-PT, PZT and PMN-PT.

According to some embodiments, ultrafine particle precursors can be fabricated via wet chemical methods, such as chemical co-precipitation, sol-gel and gel combustion. Green bodies may be formed using tape casting, slip casting, or gel casting. High pressure and high temperature sintering via techniques such as hot pressing, high pressure (HP) and hot isostatic pressure, spark plasma sintering, and microwave sintering, for example, may be used to improve the ceramic particle packing density. Thinning via lapping and/or polishing may be used to decrease surface roughness to achieve thin, highly optically transparent layers that are suitable for high displacement actuation.

As will be appreciated, the methods and systems shown and described herein may be used to form electroactive devices having a single layer or multiple layers of an electroactive material (e.g., a few layers to tens, hundreds, or thousands of stacked layers). For example, an electroactive device may include a stack of from two electroactive elements and corresponding electrodes to thousands of electroactive elements (e.g., approximately 5, approximately 10, approximately 20, approximately 30, approximately 40, approximately 50, approximately 100, approximately 200, approximately 300, approximately 400, approximately 500, approximately 600, approximately 700, approximately 800, approximately 900, approximately 1000, approximately 2000, or greater than approximately 2000 electroactive elements, including ranges between any of the foregoing values). A large number of layers may be used to achieve a high displacement output, where the overall device displacement may be expressed as the sum of the displacement of each layer. Such complex arrangements can enable compression, extension, twisting, and/or bending when operating the electroactive device.

Thus, single-layer, bi-layer, and multi-layer optical element architectures are disclosed, and may optionally include pre-strained electroactive layers, e.g., elastomeric layers. By way of example, a pre-tensioned stack may be formed by a lamination process. In conjunction with such a process, a rigid frame may be used to maintain line tension within the polymer layer(s) during lamination. Further manufacturing methods for the optical element are disclosed, including the formation of a buckled layer by thermoforming about a mold, which may be used to achieve a desired piezoelectric response while potentially obviating the need for introducing (and maintaining) layer pre-tension. Also disclosed are various augmented reality stack designs and lens geometries based on a buckled layer or molded layer paradigms.

As will be explained in greater detail below, embodiments of the instant disclosure relate to an optical element that includes a primary electrode, a secondary electrode overlapping at least a portion of the primary electrode, and an electroactive layer disposed between and abutting the primary electrode and the secondary electrode. The optical element may be optically reflective or at least partially optically transparent. An optical device may include a tunable lens or other structure that includes the optical element.

The following will provide, with reference to FIGS. 1-17, a detailed description of methods, systems, and apparatuses for forming actively tunable optical elements that include an electroactive layer and that exhibit optical reflectivity or at least partial optical transparency. The discussion associated with FIGS. 1 and 2 includes a description of example stack architectures having an electroactive layer that enable different expansion (i.e., deformation) modes. The discussion associated with FIGS. 3-5 includes a description of device structures that include, for example, a tunable grating feature or other optical filter. The discussion associated with FIGS. 6 and 7 illustrates representative deformation profiles for multi-layer optical elements. The discussion associated with FIG. 8 describes the co-integration of a deformable optical element with a Fresnel lens.

Figure 9:
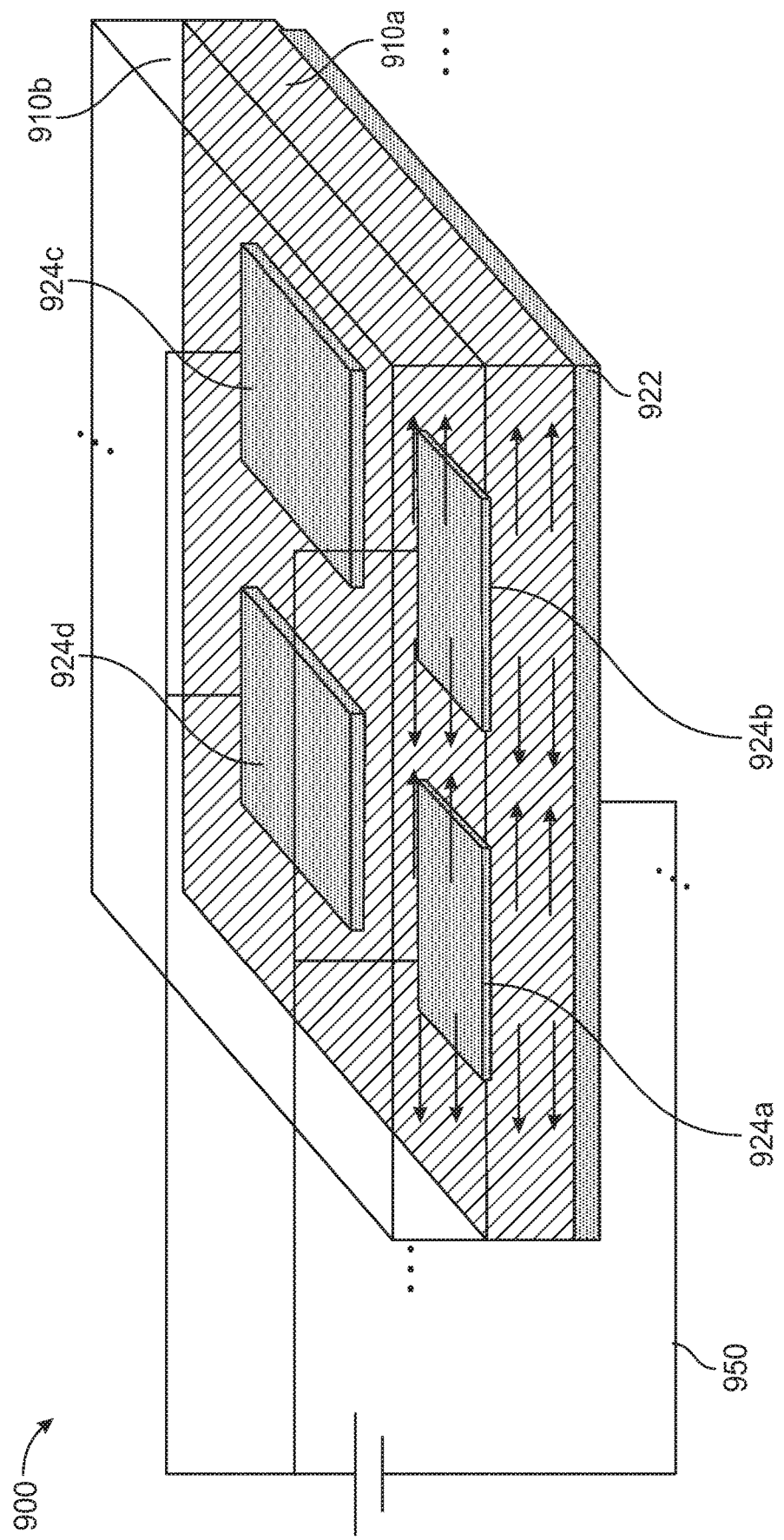
FIG. 9 is a perspective view of an optical element including a patterned electrode illustrating localized actuation of an electroactive layer according to certain embodiments.

FIG. 9 shows an example of an optical element that includes a patterned electrode that can be capacitively actuated to achieve spatially-localized deformation of the optical element. The discussion associated with FIGS. 10-13 illustrates the application of an optical element having an electroactive layer to achieve beam steering with eye relief adjustment and tip/tilt adjustment in a Maxwellian viewer for a head-mounted display.

Figure 14:
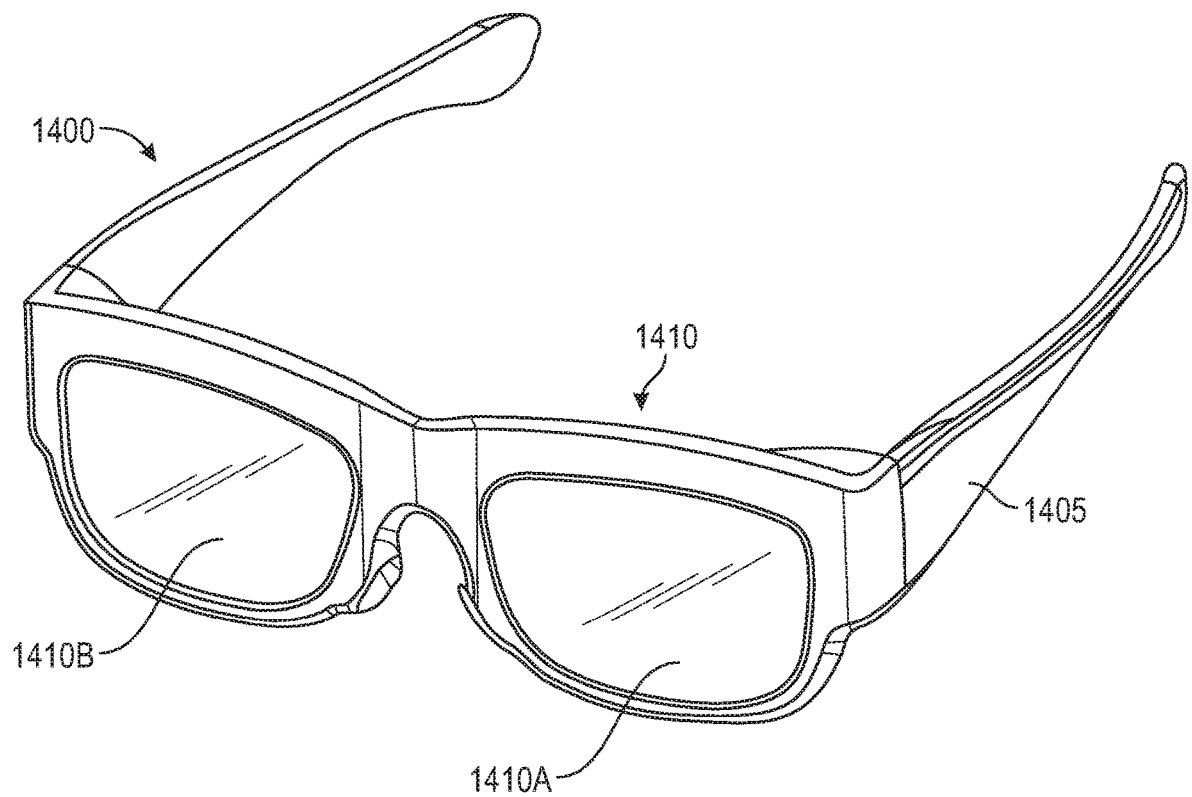
FIG. 14 is a schematic illustration of an example head-mounted display according to various embodiments.

FIG. 14 shows a schematic illustration of a head-mounted display. The discussion associated with FIGS. 15-17 relates to exemplary virtual reality and augmented reality devices that may include a reflective or at least partially transparent optical element.

Example optical element architectures capable of exhibiting different deformation modes are shown in FIGS. 1A, 1B and 2A, 2B. In FIG. 1A, an optical element 100 may include an electroactive layer 110 sandwiched between a primary (i.e., lower) electrode 122 and a secondary (i.e., upper) electrode 124. Optical element 100 may additionally include one or more optical layers 132, 134. For instance, primary electrode 122 may be disposed over optical layer 132, and optical layer 134 may be disposed over secondary electrode 124. Optical element 100 may be anchored at one end at boundary 140. Optical layers 132, 134 may include a lens or a grating layer, for example.

Figure 1B:
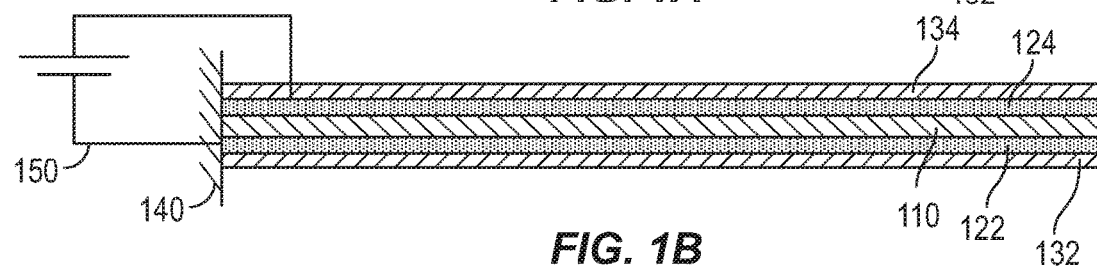
FIG. 1B depicts the optical element of FIG. 1A following actuation according to some embodiments.

Referring to FIG. 1B, the application of an electric field to the electroactive layer 110, e.g., via electrodes 122, 124 using circuit 150 may induce compression of the optical element 100 in the direction of the applied field and a transverse strain causing a lateral expansion (d) in one direction.

Figure 2A:
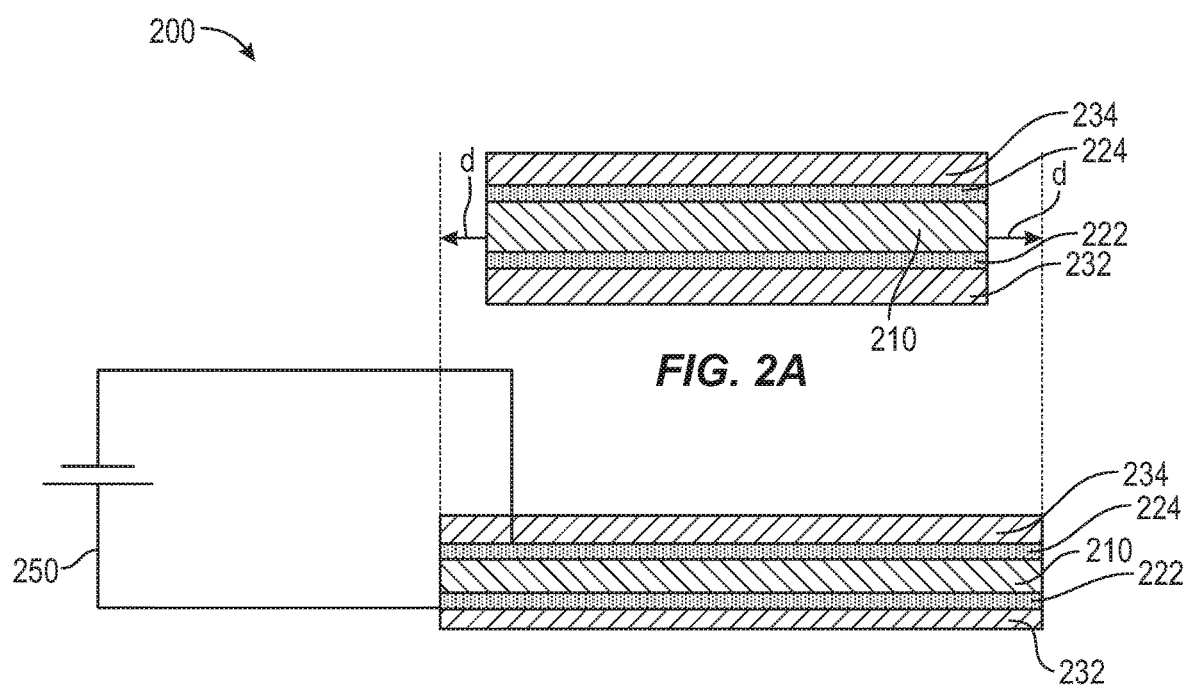
FIG. 2A depicts a cross-sectional view of an optical element including an electroactive layer and having a deformation mode defined by unfixed ends according to some embodiments.

Referring to FIG. 2A, a further example optical element 200 may include, from bottom to top, optical layer 232, primary electrode 222, electroactive layer 210, secondary electrode 224, and optical layer 234. Each end of optical element 200 may be unbounded. As in the previous embodiments, optical layers 232, 234, if provided, may include a lens or a grating layer.

Figure 2B:
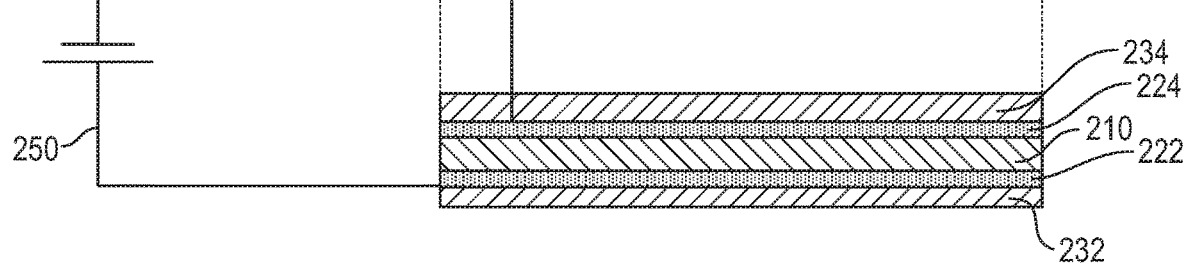
FIG. 2B depicts the optical element of FIG. 2A following actuation according to some embodiments.

Referring to FIG. 2B, the application of an electric field to the electroactive layer 210, e.g., via electrodes 222, 224 using circuit 250 may induce compression of the optical element 200 in the direction of the applied field and a transverse strain causing a lateral expansion (d) in more than one direction.

In certain embodiments, actuation of the electroactive layer and the attendant deformation may be used to alter the polarization state of light incident on the optical element. For instance, FIGS. 3A and 3B schematically illustrate the modification of incident light modulation for an optical device including a polarization volume hologram (PVH) as a grating feature. The optical device 300 includes an optical element having an electroactive layer 310 disposed between a primary electrode 322 and a secondary electrode 324. A stack disposed over the optical element, i.e., directly over the secondary electrode 324, includes, from bottom to top, an integration layer 360, a photopolymer layer 370, and a liquid crystal layer 380. In various embodiments, the integration layer 360 may include one or more of an encapsulation layer, an adhesion layer, and a barrier layer. Liquid crystal layer 380 may include a polarization volume hologram (PVH).

As seen with reference to FIG. 3B, actuation of the electroactive layer 310, e.g., via electrodes 322, 324 using circuit 350, and the attendant lateral expansion of the stack (for example, layers 310, 360, 370, 380) may decrease the pitch and reorient the optical axis of the liquid crystal polarization volume hologram layer 380, which in turn may vary the optical angle between incident light 301 and output light 302.

According to further embodiments, a multi-layer active grating including a structured layer is shown in FIGS. 4A and 4B. Referring to FIG. 4A, optical device 400 may include an optical element having an electroactive layer 410 disposed between a primary electrode 422 and a secondary electrode 424. The optical device 400 further includes an integration layer 460 disposed over the secondary electrode 424 and a structured layer 490 as a grating feature disposed over the integration layer 460. The structured layer 490 may include a 2D or a 2.5D surface, such as a Fresnel surface.

As shown in FIG. 4B, compression of the stack by applying a voltage across the electroactive layer 410, e.g., via primary electrode 422 and secondary electrode 424 using circuit 450, may change the pitch and the height of the structured layer surface varying the angle of the diffracted light 402 relative to that of incident light 401. That is, in certain embodiments, lateral expansion of the electroactive layer 410 may increase the pitch and decrease the feature height of the structured layer 490, which may modify the maximum diffracted wavelength therethrough.

Referring to FIGS. 5A and 5B, a multi-layer optical device according to further embodiments may include an optical element and plural thin film static filters disposed over the optical element and configured to function as a dichroic (or interference) filter. As shown in FIG. 5A, optical device 500 includes, from bottom to top, a primary electrode 522, an electroactive layer 510, a secondary electrode 524, and a sub-stack of optical layers 533, 535, 537, which may include thin metal and/or dielectric films.

Referring to FIG. 5B, different spectral components of incident white light 501 are transmitted 502 or reflected 503 as a function of the sub-stack thickness, which may be tuned via actuation of the electroactive layer 510, e.g., using circuit 550 to apply a voltage across the electroactive layer via primary and secondary electrodes 522, 524.

According to some embodiments, an optical element may have a bimorph or multi-morph architecture that includes plural electroactive layers. Independent actuation of the electroactive layers may be used, for example, to induce bending, buckling, torsion, etc. in an optical device that includes such an optical element. For instance, in a bimorph architecture, two electroactive layers acting alternately in expansion and compression, e.g., via oppositely applied voltages, may be used to create a bending deformation and an associated curvature change of the electroactive layers.

Referring to FIG. 6A, depicted schematically is a deformation profile for optical element 600 anchored at one end by boundary 640. The example optical element 600 may include, from bottom to top, optical layer 632, primary electrode 622, electroactive layer 610a, secondary electrode 624, electroactive layer 610b, tertiary electrode 626, and optical layer 634. As shown in FIG. 6B, the application of a voltage across one or both electroactive layers 610a, 610b, e.g., using circuit 650 to apply a voltage across electroactive layer 610a via primary and secondary electrodes 622, 624 and/or to apply a voltage across electroactive layer 610b via secondary and tertiary electrodes 624, 626 may induce a bending deformation (d) in optical element 600.

According to further embodiments, and with reference to FIG. 7A depicted schematically is a deformation profile for optical element 700 anchored at both ends by boundaries 740, 742. The optical element 700 depicted in FIG. 7A may include, from bottom to top, optical layer 732, primary electrode 722, electroactive layer 710a, secondary electrode 724, electroactive layer 710b, tertiary electrode 726, and optical layer 734. As shown in FIG. 7B, the application of a voltage across one or both electroactive layers 710a, 710b, e.g., using circuit 750 to apply a voltage across electroactive layer 710a via primary and secondary electrodes 722, 724 and/or to apply a voltage across electroactive layer 710b via secondary and tertiary electrodes 724, 726 may induce a buckling deformation (d) in optical element 700.

In conjunction with the embodiments illustrated in FIGS. 6 and 7, bending or buckling may be used to create curvature change of an optical element. For a 50/50 or other variable transparency mirror, for example, where an optical layer may include an aluminum or silver coating, beam steering in a beam splitter or accommodation may be electrically controlled and adjusted. At resonance, the controllable beam deformation could be used for a large area scanning display.

In some embodiments, with reference to FIG. 8A, a Fresnel lens may be integrated with an optical element, such as an optical element having a bimorph architecture. In the illustrated embodiment, optical element 800 may include an electroactive layer 810a disposed between a primary electrode 822 and a secondary electrode 824, and an electroactive layer 810b disposed between the secondary electrode 824 and a tertiary electrode 826. A Fresnel lens 890 may be disposed over the optical element, e.g., directly over tertiary electrode 826.

Referring to FIG. 8B, actuation of the optical element 800, e.g., by applying a voltage through either or both electroactive layers 810a, 810b via circuit 850, can be used to tune the Fresnel lens 890. For instance, bending of a fully clamped axisymmetric or asymmetric optical device could be used to tune optical power of the Fresnel lens. Alternatively, imparting curvature to a Fresnel lens has been shown to reduce observable aberrations, which can be used to provide active aberration control as a function of optical power.

As illustrated schematically in the structures and optical devices of FIGS. 1-8, and in accordance with various embodiments, electromechanically-induced strain in the electroactive layer(s) may create deformation that, in extension, can vary the pitch within an active grating or, in bending, can change curvature to vary optical power, selectively reflect or refract light, and/or provide beam steering.

In the foregoing examples, the area of the electrodes (e.g., the primary and secondary electrodes) may be equal to or substantially equal to the area of the intervening electroactive layer. As used herein, values that are "substantially equal" may, in some examples, differ by at most 10%, e.g., 1, 2, 4, or 10%, including ranges between any of the foregoing values.

According to some embodiments, patterned electrodes (e.g., one or both of a primary electrode and a secondary electrode) may be used to actuate one or more regions within an intervening electroactive layer, i.e., to the exclusion of adjacent regions within the same electroactive layer. For example, spatially-localized actuation of optical elements that include a polymeric electroactive layer can be used to tune the birefringence of such structure, where the birefringence may be a function of local mechanical stress.

Referring to FIG. 9, and in accordance with certain embodiments, an optical element includes such a patterned electrode. As illustrated, optical element 900 includes, from bottom to top, primary electrode 922, electroactive layer 910a, patterned secondary electrodes 924a, 924b, 924c, 924d, and electroactive layer 910b. Circuit 950 is electrically connected to primary electrode 922 as well as to each of patterned secondary electrodes 924a, 924b, 924c, 924d. One or more of the patterned electrodes, e.g., patterned secondary electrodes 924a, 924b, 924c, 924d, can be used to selectively actuate an electroactive layer over smaller length scales than for a pair of un-patterned electrodes.

In some embodiments, such plural (patterned) secondary electrodes may be independently actuatable or, as illustrated, actuated in parallel. Patterned electrodes may be formed by selective deposition of an electrode layer or by blanket deposition of an electrode layer followed by patterning and etching, e.g., using photolithographic techniques, as known to those skilled in the art.

Referring still to FIG. 9, arrows indicate the relative direction and amplitude of the electromechanically applied stress. Such spatially-localized actuation may be used in conjunction with selective polarizers, for example, which may employ sub-millimeter scale actuation control of birefringence and beam steering to achieve lens optics with decreased aberrations.

According to still further embodiments, the application of an optical element to beam steering, i.e., active optical power adjustment, and one or both of eye relief and tip/tilt adjustment in a Maxwellian viewer for a head-mounted display (HMD) is illustrated in FIGS. 10-13. In certain embodiments, active optical power adjustment may be performed using metamaterials, plasmonic, and 50/50 mirrors, and the like.

Referring to FIG. 10A, a projector 1052 may be mounted on the temple arm 1054 of a head-mounted display (HMD) 1000. Projected light 1062 may be reflected within the transparent area 1056 of the lens 1057 and the resulting reflected light 1064 may be focused onto the pupil of a user 1070 who is simultaneously viewing object 1080. Transparent area 1056 may include an optical element 1059, as disclosed herein. Optical element 1059 may include unpatterned or patterned electrodes (not shown).

Figure 10C:
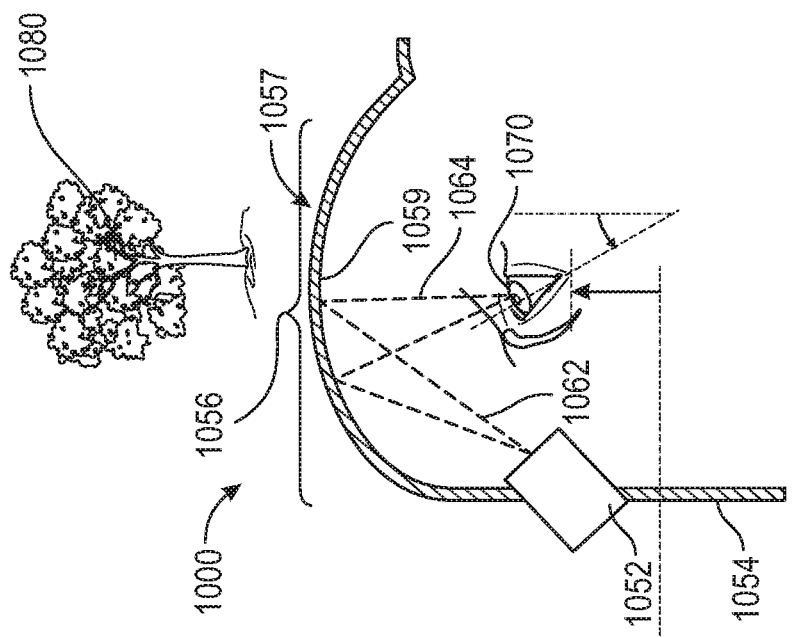
FIG. 10C depicts the Maxwellian viewer of FIG. 10A showing actuation of the optical element and an associated tip/tilt adjustment according to some embodiments.

According to some embodiments, actuation of the electrodes (e.g., selective actuation of fully-clamped optical element 1059) may change a curvature of lens 1057, decrease the focal distance and provide eye relief adjustment, as shown in FIG. 10B. Referring to FIG. 10C, according to further embodiments, localized actuation of optical element 1059 may induce bending of lens 1057 and provide tip/tilt adjustment. According to still further embodiments, controlled actuation of optical element 1059 may provide both eye relief and tip/tile adjustment, as depicted in FIG. 10D.

Figure 10D:
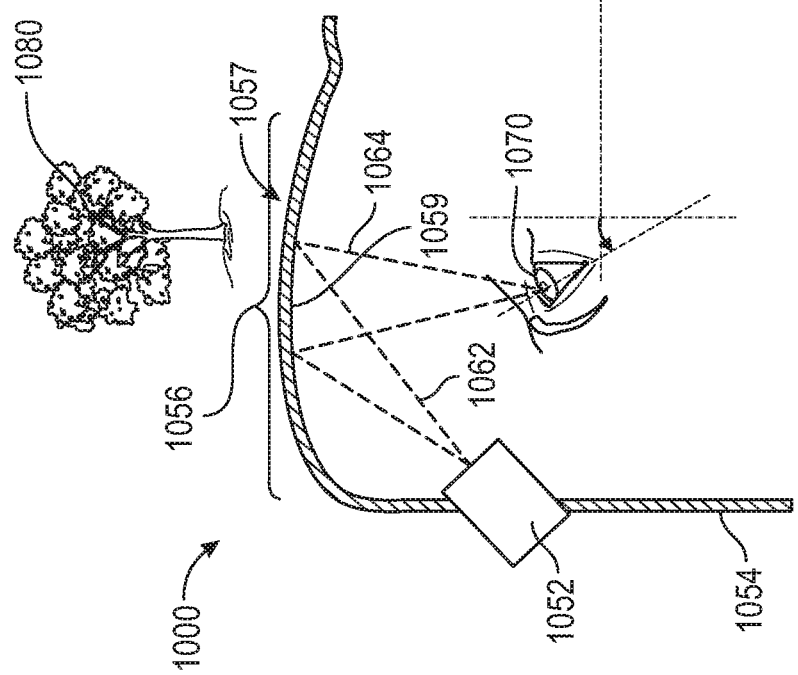
FIG. 10D depicts the Maxwellian viewer of FIG. 10A showing actuation of the optical element and both active eye relief and active tip/tilt adjustment according to some embodiments.
Figure 11A:
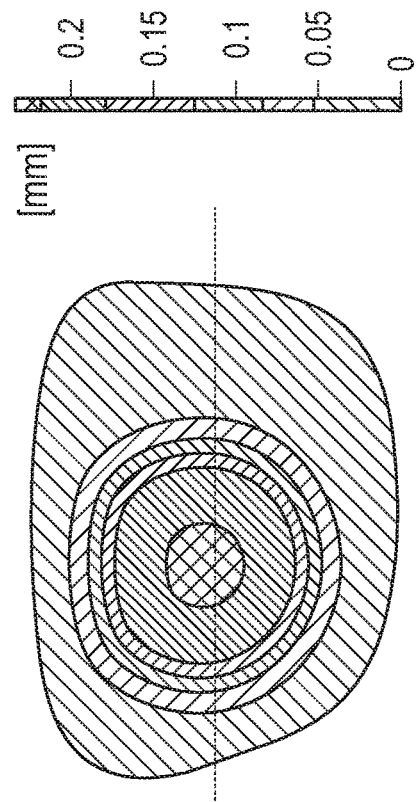
FIG. 11A is a representation of a lens including an aperture and an optical element having patterned electrodes disposed within the aperture according to some embodiments.
Figure 11B:
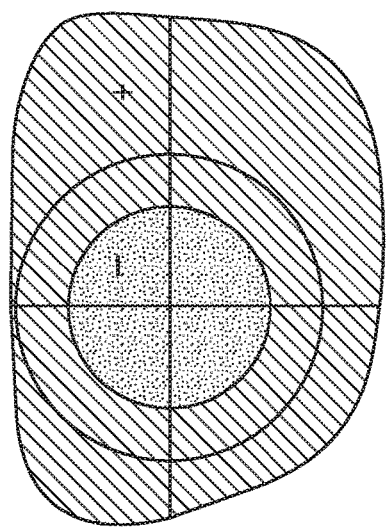
FIG. 11B depicts the lens and optical element of FIG. 11A and the implementation of active eye relief adjustment through selective actuation of the patterned electrodes according to various embodiments.
Figure 11C:
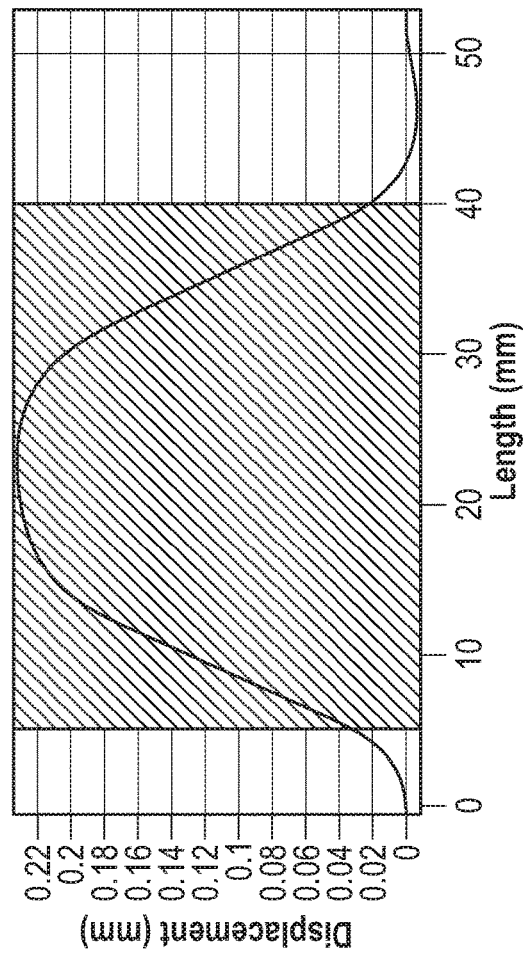
FIG. 11C is a plot of displacement versus distance with respect to an aperture active area according to certain embodiments.

Referring to FIGS. 11A, 12A, and 13A, shown are example electrode patterns that may be used to provide the curvature, bending, and combined curvature and bending deformations shown in FIGS. 10B, 10C and 10D, respectively. As shown in FIG. 11A, an axisymmetric electrode pattern may be used to induce a nearly axisymmetric deformation. As shown in FIG. 12A, an asymmetric electrode pattern may be used to induce a nearly asymmetric deformation for beam steering. Finally, FIG. 13A shows an electrode pattern that enables simultaneous tip/tilt and curvature adjustment. The asymmetric electrode pattern of FIG. 13A may be used to induce tip/tilt while the axisymmetric nature of the electrode pattern may create a nearly axisymmetric curvature change to adjust optical power. In each of FIGS. 11A, 12A, and 13A, positively (+) and negatively (−) biased portions of the structure are respectively annotated. Corresponding deformation profiles are shown in FIGS. 11B, 12B, and 13B, while FIGS. 11C, 12C, and 13C are plots of displacement versus position. In each of FIGS. 11C, 12C, and 13C, the shaded area indicates the aperture active area.

According to some embodiments, patterned electrodes may be used to select the area of an aperture over which variable tip/tilt and curvature is effective, and accordingly selectively actuate the electrodes resulting in decoupled tip/tilt and curvature adjustment. In some embodiments, such as in device applications where tip/tilt adjustment may be applied over a larger aperture area, edge mounted actuators can be used for tip/tilt adjustment or to augment electrically controllable tip/tilt or curvature change induced by the electroactive-containing optical element within the full or partially transparent aperture.

As will be appreciated, when incorporated into various optical devices, such as a diffraction grating, Fresnel lens, immersed Fresnel lens, or polarization volume hologram, etc., the foregoing deformation modes may create variable pitch and/or dimension change of one or more device features, which can controllably alter, for example, the diffraction or refraction of incident light. For instance, depending on the grating feature, actuation of an optical element may be used to modify at least one of transmission, reflectance, optical path length, birefringence and/or direction of an optical axis to realize tunable transmission amplitude, reflectance amplitude, phase diffraction or optical axis diffraction gratings, respectively. In particular embodiments, the actuation of an optical element may be used to control its transparency or reflectivity.

Embodiments of the present disclosure may include or be implemented in conjunction with various types of artificial reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

FIG. 14 is a diagram of a head-mounted display (HMD) 1400 according to some embodiments. The HMD 1400 may include a lens display assembly, which may include one or more display devices. The depicted embodiment includes a left lens display assembly 1410A and a right lens display assembly 1410B, which are collectively referred to as lens display assembly 1410. The lens display assembly 1410 may be located within a transparent aperture of the HMD 1400 and configured to present media to a user.

Examples of media presented by the lens display assembly 1410 include one or more images, a series of images (e.g., a video), audio, or some combination thereof. In some embodiments, audio may be presented via an external device (e.g., speakers and/or headphones) that receives audio information from the lens display assembly 1410, a console (not shown), or both, and presents audio data based on the audio information. The lens display assembly 1410 may generally be configured to operate as an augmented reality near-eye display (NED), such that a user can see media projected by the lens display assembly 1410 and also see the real-world environment through the lens display assembly 1410. However, in some embodiments, the lens display assembly 1410 may be modified to operate as a virtual reality NED, a mixed reality NED, or some combination thereof. Accordingly, in some embodiments, the lens display assembly 1410 may augment views of a physical, real-world environment with computer-generated elements (e.g., images, video, sound, etc.).

The HMD 1400 shown in FIG. 14 may include a support or frame 1405 that secures the lens display assembly 1410 in place on the head of a user, in embodiments in which the lens display assembly 1410 includes separate left and right displays. In some embodiments, the frame 1405 may be a frame of eyewear glasses. As is described herein in greater detail, the lens display assembly 1410, in some examples, may include a waveguide with holographic or volumetric Bragg gratings. In some embodiments, the gratings may be generated by a process of applying one or more dopants or photosensitive media to predetermined portions of the surface of the waveguide and subsequent ultraviolet (UV) light exposure or application of other activating electromagnetic radiation.

Artificial-reality systems may be implemented in a variety of different form factors and configurations. Some artificial reality systems may be designed to work without near-eye displays (NEDs), an example of which is augmented-reality system 1500 in FIG. 15. Other artificial reality systems may include a NED that also provides visibility into the real world (e.g., augmented-reality system 1600 in FIG. 16) or that visually immerses a user in an artificial reality (e.g., virtual-reality system 1700 in FIG. 17). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 15:
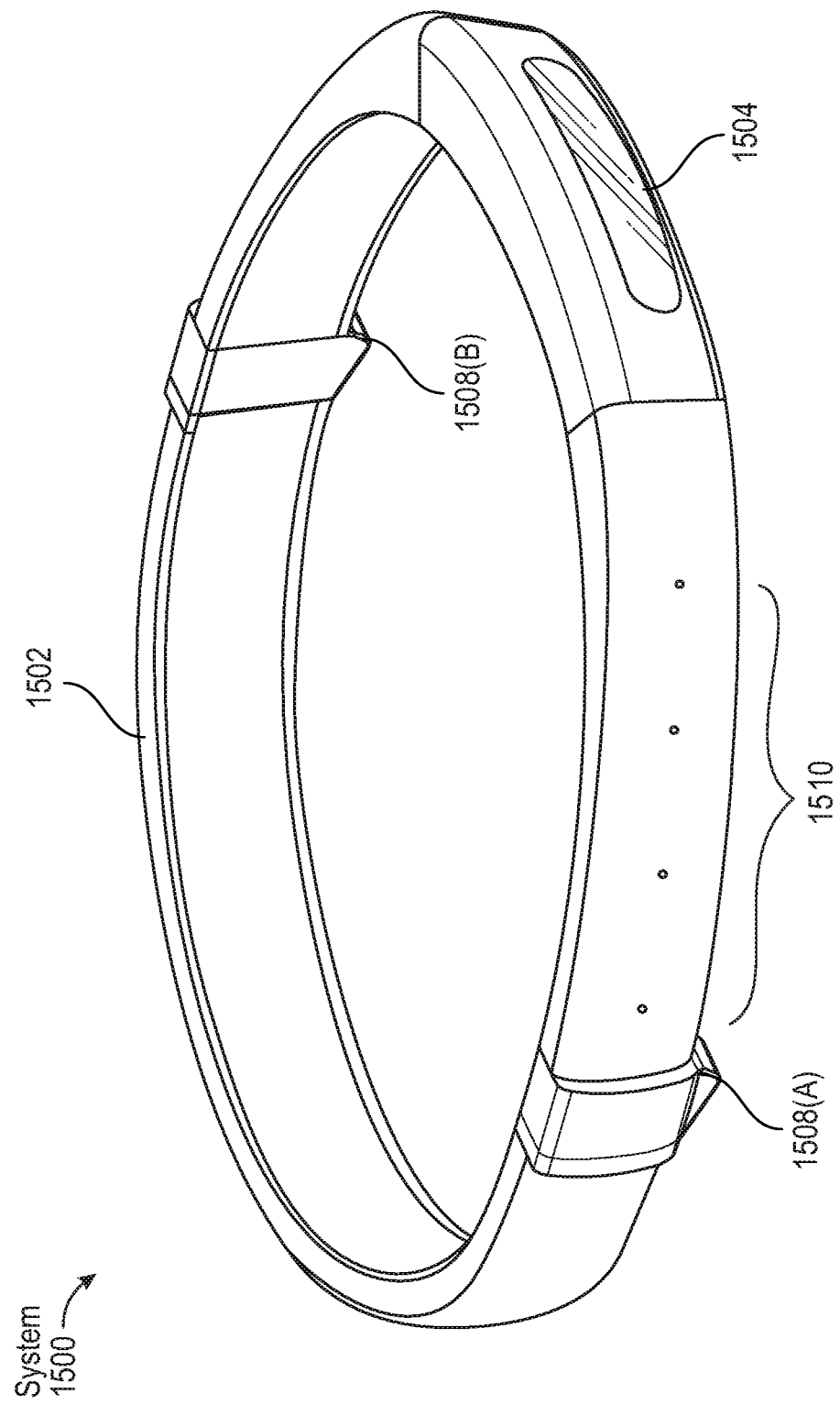
FIG. 15 is an illustration of an exemplary artificial-reality headband that may be used in connection with embodiments of this disclosure.

Turning to FIG. 15, augmented-reality system 1500 generally represents a wearable device dimensioned to fit about a body part (e.g., a head) of a user. As shown in FIG. 15, system 1500 may include a frame 1502 and a camera assembly 1504 that is coupled to frame 1502 and configured to gather information about a local environment by observing the local environment. Augmented-reality system 1500 may also include one or more audio devices, such as output audio transducers 1508(A) and 1508(B) and input audio transducers 1510. Output audio transducers 1508(A) and 1508(B) may provide audio feedback and/or content to a user, and input audio transducers 1510 may capture audio in a user's environment.

As shown, augmented-reality system 1500 may not necessarily include a NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 1500 may not include a NED, augmented-reality system 1500 may include other types of screens or visual feedback devices (e.g., a display screen integrated into a side of frame 1502).

Figure 16:
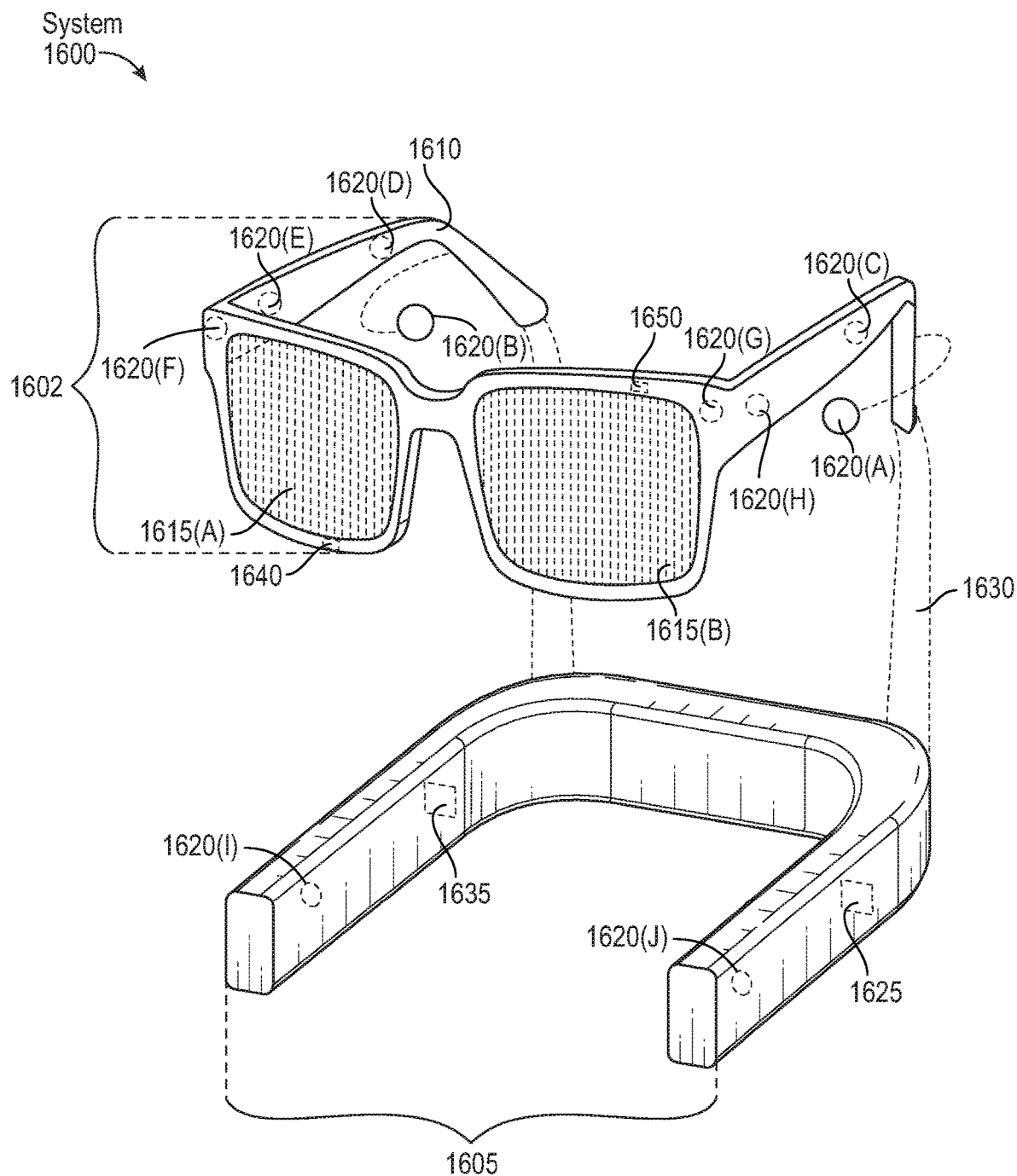
FIG. 16 is an illustration of exemplary augmented-reality glasses that may be used in connection with embodiments of this disclosure.

The embodiments discussed in this disclosure may also be implemented in augmented-reality systems that include one or more NEDs. For example, as shown in FIG. 16, augmented-reality system 1600 may include an eyewear device 1602 with a frame 1610 configured to hold a left display device 1615(A) and a right display device 1615(B) in front of a user's eyes. Display devices 1615(A) and 1615(B) may act together or independently to present an image or series of images to a user. While augmented-reality system 1600 includes two displays, embodiments of this disclosure may be implemented in augmented-reality systems with a single NED or more than two NEDs.

In some embodiments, augmented-reality system 1600 may include one or more sensors, such as sensor 1640. Sensor 1640 may generate measurement signals in response to motion of augmented-reality system 1600 and may be located on substantially any portion of frame 1610. Sensor 1640 may represent a position sensor, an inertial measurement unit (IMU), a depth camera assembly, or any combination thereof. In some embodiments, augmented-reality system 1600 may or may not include sensor 1640 or may include more than one sensor. In embodiments in which sensor 1640 includes an IMU, the IMU may generate calibration data based on measurement signals from sensor 1640. Examples of sensor 1640 may include, without limitation, accelerometers, gyroscopes, magnetometers, other suitable types of sensors that detect motion, sensors used for error correction of the IMU, or some combination thereof.

Augmented-reality system 1600 may also include a microphone array with a plurality of acoustic transducers 1620(A)-1620(J), referred to collectively as acoustic transducers 1620. Acoustic transducers 1620 may be transducers that detect air pressure variations induced by sound waves. Each acoustic transducer 1620 may be configured to detect sound and convert the detected sound into an electronic format (e.g., an analog or digital format). The microphone array in FIG. 16 may include, for example, ten acoustic transducers: 1620(A) and 1620(B), which may be designed to be placed inside a corresponding ear of the user, acoustic transducers 1620(C), 1620(D), 1620(E), 1620(F), 1620(G), and 1620(H), which may be positioned at various locations on frame 1610, and/or acoustic transducers 1620(I) and 1620(J), which may be positioned on a corresponding neckband 1605.

In some embodiments, one or more of acoustic transducers 1620(A)-(F) may be used as output transducers (e.g., speakers). For example, acoustic transducers 1620(A) and/or 1620(B) may be earbuds or any other suitable type of headphone or speaker.

The configuration of acoustic transducers 1620 of the microphone array may vary. While augmented-reality system 1600 is shown in FIG. 16 as having ten acoustic transducers 1620, the number of acoustic transducers 1620 may be greater or less than ten. In some embodiments, using higher numbers of acoustic transducers 1620 may increase the amount of audio information collected and/or the sensitivity and accuracy of the audio information. In contrast, using a lower number of acoustic transducers 1620 may decrease the computing power required by the controller 1650 to process the collected audio information. In addition, the position of each acoustic transducer 1620 of the microphone array may vary. For example, the position of an acoustic transducer 1620 may include a defined position on the user, a defined coordinate on frame 1610, an orientation associated with each acoustic transducer, or some combination thereof.

Acoustic transducers 1620(A) and 1620(B) may be positioned on different parts of the user's ear, such as behind the pinna or within the auricle or fossa. Or, there may be additional acoustic transducers on or surrounding the ear in addition to acoustic transducers 1620 inside the ear canal. Having an acoustic transducer positioned next to an ear canal of a user may enable the microphone array to collect information on how sounds arrive at the ear canal. By positioning at least two of acoustic transducers 1620 on either side of a user's head (e.g., as binaural microphones), augmented-reality device 1600 may simulate binaural hearing and capture a 3D stereo sound field around about a user's head. In some embodiments, acoustic transducers 1620(A) and 1620(B) may be connected to augmented-reality system 1600 via a wired connection 1630, and in other embodiments, acoustic transducers 1620(A) and 1620(B) may be connected to augmented-reality system 1600 via a wireless connection (e.g., a Bluetooth connection). In still other embodiments, acoustic transducers 1620(A) and 1620(B) may not be used at all in conjunction with augmented-reality system 1600.

Acoustic transducers 1620 on frame 1610 may be positioned along the length of the temples, across the bridge, above or below display devices 1615(A) and 1615(B), or some combination thereof. Acoustic transducers 1620 may be oriented such that the microphone array is able to detect sounds in a wide range of directions surrounding the user wearing the augmented-reality system 1600. In some embodiments, an optimization process may be performed during manufacturing of augmented-reality system 1600 to determine relative positioning of each acoustic transducer 1620 in the microphone array.

In some examples, augmented-reality system 1600 may include or be connected to an external device (e.g., a paired device), such as neckband 1605. Neckband 1605 generally represents any type or form of paired device. Thus, the following discussion of neckband 1605 may also apply to various other paired devices, such as charging cases, smart watches, smart phones, wrist bands, other wearable devices, hand-held controllers, tablet computers, laptop computers and other external compute devices, etc.

As shown, neckband 1605 may be coupled to eyewear device 1602 via one or more connectors. The connectors may be wired or wireless and may include electrical and/or non-electrical (e.g., structural) components. In some cases, eyewear device 1602 and neckband 1605 may operate independently without any wired or wireless connection between them. While FIG. 16 illustrates the components of eyewear device 1602 and neckband 1605 in example locations on eyewear device 1602 and neckband 1605, the components may be located elsewhere and/or distributed differently on eyewear device 1602 and/or neckband 1605. In some embodiments, the components of eyewear device 1602 and neckband 1605 may be located on one or more additional peripheral devices paired with eyewear device 1602, neckband 1605, or some combination thereof.

Pairing external devices, such as neckband 1605, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1600 may be provided by a paired device or shared between a paired device and an eyewear device, thus reducing the weight, heat profile, and form factor of the eyewear device overall while still retaining desired functionality. For example, neckband 1605 may allow components that would otherwise be included on an eyewear device to be included in neckband 1605 since users may tolerate a heavier weight load on their shoulders than they would tolerate on their heads. Neckband 1605 may also have a larger surface area over which to diffuse and disperse heat to the ambient environment. Thus, neckband 1605 may allow for greater battery and computation capacity than might otherwise have been possible on a stand-alone eyewear device. Since weight carried in neckband 1605 may be less invasive to a user than weight carried in eyewear device 1602, a user may tolerate wearing a lighter eyewear device and carrying or wearing the paired device for greater lengths of time than a user would tolerate wearing a heavy stand-alone eyewear device, thereby enabling users to more fully incorporate artificial reality environments into their day-to-day activities.

Neckband 1605 may be communicatively coupled with eyewear device 1602 and/or to other devices. These other devices may provide certain functions (e.g., tracking, localizing, depth mapping, processing, storage, etc.) to augmented-reality system 1600. In the embodiment of FIG. 16, neckband 1605 may include two acoustic transducers (e.g., 1620(1) and 1620(J)) that are part of the microphone array (or potentially form their own microphone subarray). Neckband 1605 may also include a controller 1625 and a power source 1635.

Acoustic transducers 1620(1) and 1620(J) of neckband 1605 may be configured to detect sound and convert the detected sound into an electronic format (analog or digital). In the embodiment of FIG. 16, acoustic transducers 1620(1) and 1620(J) may be positioned on neckband 1605, thereby increasing the distance between the neckband acoustic transducers 1620(1) and 1620(J) and other acoustic transducers 1620 positioned on eyewear device 1602. In some cases, increasing the distance between acoustic transducers 1620 of the microphone array may improve the accuracy of beamforming performed via the microphone array. For example, if a sound is detected by acoustic transducers 1620(C) and 1620(D) and the distance between acoustic transducers 1620(C) and 1620(D) is greater than, e.g., the distance between acoustic transducers 1620(D) and 1620(E), the determined source location of the detected sound may be more accurate than if the sound had been detected by acoustic transducers 1620(D) and 1620(E).

Controller 1625 of neckband 1605 may process information generated by the sensors on 1605 and/or augmented-reality system 1600. For example, controller 1625 may process information from the microphone array that describes sounds detected by the microphone array. For each detected sound, controller 1625 may perform a direction-of-arrival (DOA) estimation to estimate a direction from which the detected sound arrived at the microphone array. As the microphone array detects sounds, controller 1625 may populate an audio data set with the information. In embodiments in which augmented-reality system 1600 includes an inertial measurement unit, controller 1625 may compute all inertial and spatial calculations from the IMU located on eyewear device 1602. A connector may convey information between augmented-reality system 1600 and neckband 1605 and between augmented-reality system 1600 and controller 1625. The information may be in the form of optical data, electrical data, wireless data, or any other transmittable data form. Moving the processing of information generated by augmented-reality system 1600 to neckband 1605 may reduce weight and heat in eyewear device 1602, making it more comfortable to the user.

Power source 1635 in neckband 1605 may provide power to eyewear device 1602 and/or to neckband 1605. Power source 1635 may include, without limitation, lithium ion batteries, lithium-polymer batteries, primary lithium batteries, alkaline batteries, or any other form of power storage. In some cases, power source 1635 may be a wired power source. Including power source 1635 on neckband 1605 instead of on eyewear device 1602 may help better distribute the weight and heat generated by power source 1635.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 1700 in FIG. 17, that mostly or completely covers a user's field of view. Virtual-reality system 1700 may include a front rigid body 1702 and a band 1704 shaped to fit around a user's head. Virtual-reality system 1700 may also include output audio transducers 1706(A) and 1706(B). Furthermore, while not shown in FIG. 17, front rigid body 1702 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in augmented-reality system 1700 and/or virtual-reality system 1700 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in augmented-reality system 1600 and/or virtual-reality system 1700 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, augmented-reality system 1500, augmented-reality system 1600, and/or virtual-reality system 1700 may include one or more optical sensors, such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 15 and 17, output audio transducers 1508(A), 1508(B), 1706(A), and 1706(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 1510 may include condenser microphones, dynamic microphones, ribbon microphones, and/or any other type or form of input transducer. In some embodiments, a single transducer may be used for both audio input and audio output.

Figure 17:
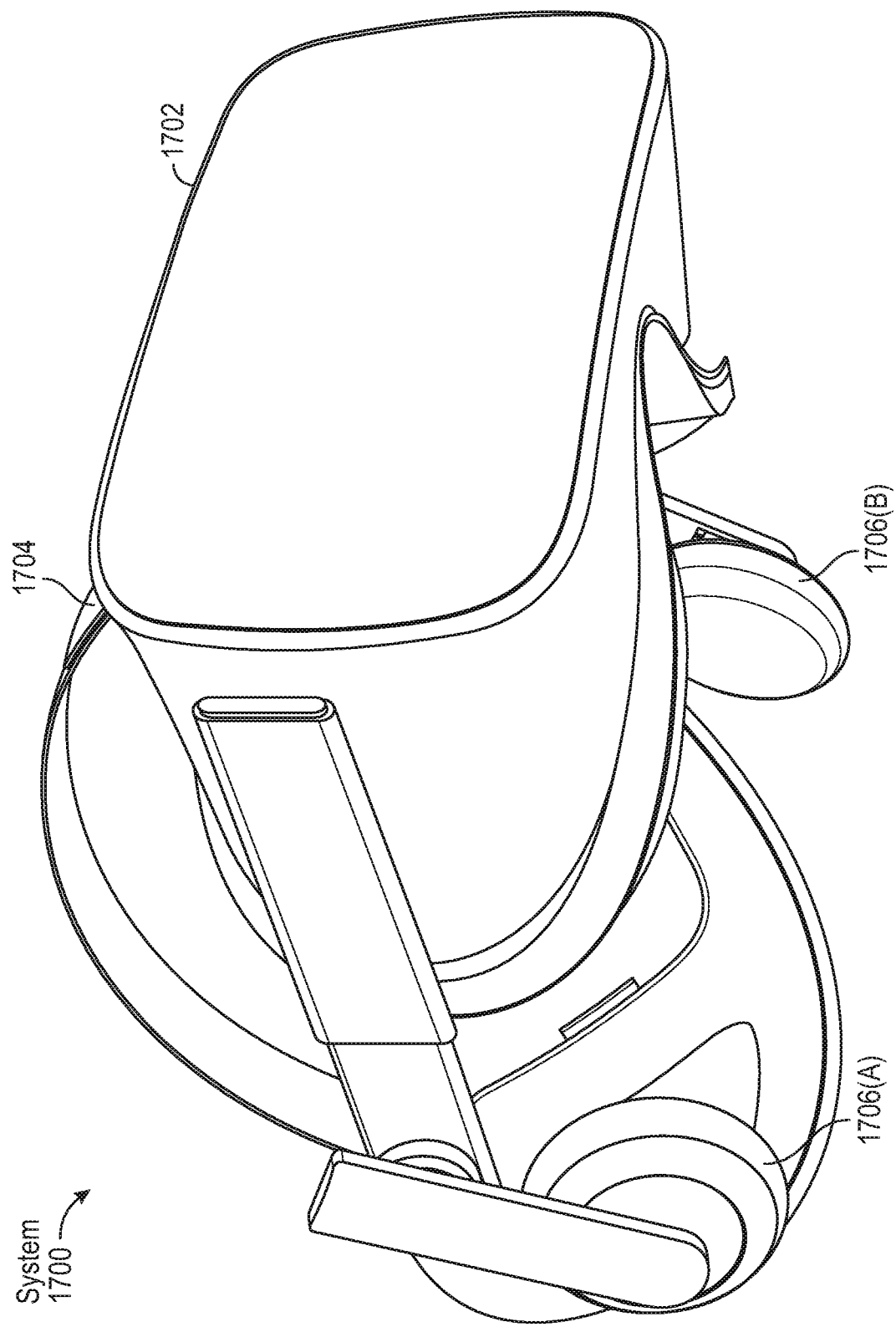
FIG. 17 is an illustration of an exemplary virtual-reality headset that may be used in connection with embodiments of this disclosure.

While not shown in FIGS. 15-17, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A transparent optical element comprising:
   a primary electrode;
   a secondary electrode overlapping at least a portion of the primary electrode; and
   an electroactive layer disposed between and abutting the primary electrode and the secondary electrode, the electroactive layer having a non-zero stress state when zero voltage is applied between the primary electrode and the secondary electrode, wherein the optical element further comprises:
   a first optical transmittance, a first refractive index, and a first optical path when a first voltage is applied between the primary electrode and the secondary electrode; and
   at least one of:
   a second optical transmittance different from the first optical transmittance,
   a second refractive index different from the first refractive index, and
   a second optical path through the optical element different from the first optical path when a second voltage different from the first voltage is applied between the primary electrode and the secondary electrode.

2. The optical element of claim 1, wherein the first optical transmittance and the second optical transmittance are each greater than 80%.

3. The optical element of claim 1, wherein the electroactive layer comprises a dielectric elastomer, a piezoelectric polymer, or an electrostrictive polymer.

4. The optical element of claim 1, wherein the electroactive layer comprises a PVDF homopolymer, a P(VDF-TrFE) co-polymer, a P(VDF-TrFE-CFE) ter-polymer or a P(VDF-TrFE-CTFE) ter-polymer.

5. The optical element of claim 1, wherein the electroactive layer comprises a piezoelectric ceramic, an electrostrictive ceramic, a polycrystalline ceramic, or a single crystal ceramic.

6. The optical element of claim 5, wherein the electroactive layer comprises a perovskite ceramic.

7. The optical element of claim 1, further comprising a deformable layer, wherein the deformable layer comprises a material selected from the group consisting of a gel, a foam, a liquid, a gas, and a polymer.

8. The optical element of claim 1, wherein the electroactive layer comprises:
 a first orientation of dipoles when the first voltage is applied between the primary electrode and the secondary electrode; and
 a second orientation of dipoles different from the first orientation when the second voltage is applied between the primary electrode and the secondary electrode.

9. A head-mounted display comprising the optical element of claim 1.

10. An optical device, comprising:
 a transparent aperture; and
 an optical element located within the aperture, the optical element comprising:
  a primary electrode;
  a secondary electrode overlapping at least a portion of the primary electrode; and
  a first electroactive layer disposed between and abutting the primary electrode and the secondary electrode, the first electroactive layer having a non-zero stress state when zero voltage is applied between the primary electrode and the secondary electrode, wherein the optical element is configured to be reversibly actuated between a first state and a second state, the first state comprising a first transmissivity, a first refractive index, and a first optical path through the optical element, and the second state comprising at least one of a second transmissivity different from the first transmissivity, a second refractive index different from the first refractive index, and a second optical path through the optical element different from the first optical path.

11. The optical device of claim 10, wherein the optical element comprises a tunable lens having a geometry selected from the group consisting of prismatic, freeform, plano, meniscus, bi-convex, plano-convex, bi-concave, and plano-concave.

12. The optical device of claim 10, further comprising an optical stack disposed over the optical element, the optical stack comprising, from bottom to top:
 an integration layer;
 a photopolymer layer; and
 a liquid crystal layer.

13. The optical device of claim 12, wherein the liquid crystal layer comprises a polarization volume hologram.

14. The optical device of claim 10, further comprising an optical stack disposed over the optical element, the optical stack comprising, from bottom to top:
 an integration layer; and
 a structured layer having a 2D or 2.5D patterned surface.

15. The optical device of claim 10, wherein the optical element further comprises:
 a tertiary electrode overlapping at least a portion of the secondary electrode; and
 a second electroactive layer disposed between and abutting the secondary electrode and the tertiary electrode.

16. The optical device of claim 15, wherein one of the first electroactive layer and the second electroactive layer is in a state of lateral compression and the other of the first electroactive layer and the second electroactive layer is in a state of lateral expansion.

17. A method comprising:
 forming a first electroactive layer over a primary electrode;
 forming a secondary electrode over the first electroactive layer to form an optical element, the first electroactive layer having a non-zero stress state when zero voltage is applied between the primary electrode and the secondary electrode; and
 applying a first voltage between the primary electrode and the secondary electrode to deform the first electroactive layer and modify at least one of:
 a transmissivity of the optical element,
 a refractive index of the optical element, and
 an optical path through the optical element.

18. The method of claim 17, further comprising:
 forming a second electroactive layer over the secondary electrode;
 forming a tertiary electrode over the second electroactive layer; and
 applying a second voltage between the secondary electrode and the tertiary electrode to deform the second electroactive layer, such that one of the first electroactive layer and the second electroactive layer is in a state of lateral compression and the other of the first electroactive layer and the second electroactive layer is in a state of lateral expansion.

19. The method of claim 17, further comprising patterning the secondary electrode to form a plurality of secondary electrodes over the first electroactive layer.

* * * * *